(12) United States Patent
Loeffelholz et al.

(10) Patent No.: US 8,265,447 B2
(45) Date of Patent: Sep. 11, 2012

(54) MODULAR FIBER OPTIC ENCLOSURE WITH EXTERNAL CABLE SPOOL

(75) Inventors: Todd Loeffelholz, Minnetonka, MN (US); Hai Bin Lei, Song Jiang District (CN); Hua Li Wang, Bin Hai (CN); Peng Yun Li, Su Zhou (CN)

(73) Assignee: ADC Telecommunications, Inc., Eden Prairie, MN (US)

( * ) Notice: Subject to any disclaimer, the term of this patent is extended or adjusted under 35 U.S.C. 154(b) by 311 days.

(21) Appl. No.: 12/560,181

(22) Filed: Sep. 15, 2009

(65) Prior Publication Data

US 2010/0074587 A1   Mar. 25, 2010

Related U.S. Application Data

(60) Provisional application No. 61/097,536, filed on Sep. 16, 2008.

(51) Int. Cl.
*G02B 6/00* (2006.01)
(52) U.S. Cl. ........................................ 385/135
(58) Field of Classification Search .................. None
See application file for complete search history.

(56) References Cited

U.S. PATENT DOCUMENTS

| | | |
|---|---|---|
| 1,276,825 A | 8/1918 | Swope |
| 1,442,999 A | 1/1923 | Boyle |
| 1,446,410 A | 2/1923 | McCormick et al. |
| 1,474,580 A | 11/1923 | Clark et al. |
| RE20,995 E | 2/1939 | Beasley |
| 2,434,363 A | 1/1948 | Lenox |
| 2,502,496 A | 4/1950 | Wickman |
| 2,521,226 A | 9/1950 | Keller |
| 2,727,703 A | 12/1955 | Bonnett |
| 3,091,433 A | 5/1963 | Riley |
| 3,131,729 A | 5/1964 | Leysinger |
| 3,657,491 A | 4/1972 | Ryder et al. |
| 3,667,417 A | 6/1972 | Clinkenbeard |
| 3,920,308 A | 11/1975 | Murray |
| 3,940,086 A | 2/1976 | Stoquelet |
| 4,053,118 A | 10/1977 | Aikins |
| 4,081,258 A | 3/1978 | Goell et al. |
| 4,282,954 A | 8/1981 | Hill |
| 4,384,688 A | 5/1983 | Smith |
| 4,587,801 A | 5/1986 | Missout et al. |
| 4,635,875 A | 1/1987 | Apple |
| 4,657,140 A | 4/1987 | Zagar et al. |

(Continued)

FOREIGN PATENT DOCUMENTS
DE    42 26 368 A1    2/1994
(Continued)

OTHER PUBLICATIONS

"V-Linx™ EZ-Spool Combiner", Furukawa Electric North America, Copyright © 2007.

(Continued)

*Primary Examiner* — Mike Stahl
(74) *Attorney, Agent, or Firm* — Merchant & Gould P.C.

(57) ABSTRACT

A fiber optic enclosure includes a housing and a cable spool assembly. The housing includes a main body and a cover mounted to the main body. The cover and the main body cooperatively define an interior region. The cable spool assembly is connected to an exterior of the housing. The cable spool assembly includes a drum portion and a strain relief post.

21 Claims, 42 Drawing Sheets

U.S. PATENT DOCUMENTS

| | | | |
|---|---|---|---|
| 4,666,237 A | 5/1987 | Mallinson | |
| 4,669,705 A | 6/1987 | Langston | |
| 4,767,073 A | 8/1988 | Malzacher | |
| 4,846,343 A | 7/1989 | Rupert | |
| 4,869,437 A | 9/1989 | Berz et al. | |
| 4,880,182 A | 11/1989 | Gelfman | |
| 4,883,337 A | 11/1989 | Dahlgren | |
| 4,913,369 A | 4/1990 | Lia et al. | |
| 4,938,432 A | 7/1990 | Kurt et al. | |
| 4,939,798 A | 7/1990 | Last | |
| 4,940,859 A | 7/1990 | Peterson | |
| 5,013,121 A | 5/1991 | Anton et al. | |
| 5,016,554 A | 5/1991 | Harris, Jr. et al. | |
| 5,066,256 A | 11/1991 | Ward, Sr. | |
| 5,074,863 A | 12/1991 | Dines | |
| 5,109,467 A | 4/1992 | Hogan et al. | |
| 5,169,969 A | 12/1992 | Sherif | |
| 5,185,843 A | 2/1993 | Aberson et al. | |
| 5,265,815 A | 11/1993 | Soyka et al. | |
| 5,280,861 A | 1/1994 | Corriveau | |
| 5,323,479 A | 6/1994 | Allen | |
| 5,335,874 A | 8/1994 | Shrum et al. | |
| 5,388,781 A | 2/1995 | Sauber | |
| 5,394,466 A | 2/1995 | Schneider et al. | |
| 5,494,446 A | 2/1996 | DeLucia et al. | |
| 5,519,275 A | 5/1996 | Scott et al. | |
| 5,520,346 A | 5/1996 | Hoban | |
| 5,522,561 A | 6/1996 | Koyamatsu et al. | |
| 5,529,186 A | 6/1996 | Bass | |
| 5,544,836 A | 8/1996 | Pera | |
| 5,551,545 A | 9/1996 | Gelfman | |
| 5,638,481 A | 6/1997 | Arnett | |
| 5,703,990 A | 12/1997 | Robertson et al. | |
| 5,709,347 A | 1/1998 | Hoffmann et al. | |
| 5,717,810 A | 2/1998 | Wheeler | |
| 5,718,397 A | 2/1998 | Stevens | |
| 5,749,148 A | 5/1998 | White, III et al. | |
| 5,773,757 A | 6/1998 | Kenney et al. | |
| 5,787,219 A | 7/1998 | Mueller et al. | |
| 5,915,062 A | 6/1999 | Jackson et al. | |
| 5,915,640 A | 6/1999 | Wagter et al. | |
| 5,987,203 A | 11/1999 | Abel et al. | |
| 5,992,787 A | 11/1999 | Burke | |
| 6,087,587 A | 7/2000 | Gonzalez | |
| 6,215,938 B1 | 4/2001 | Reitmeier et al. | |
| 6,220,413 B1 | 4/2001 | Walters et al. | |
| 6,315,598 B1 | 11/2001 | Elliot et al. | |
| 6,361,360 B1 * | 3/2002 | Hwang et al. | 439/501 |
| 6,385,381 B1 | 5/2002 | Janus et al. | |
| 6,480,660 B1 | 11/2002 | Reitmeier et al. | |
| 6,494,396 B2 | 12/2002 | Sugata | |
| 6,496,641 B1 | 12/2002 | Mahony | |
| 6,503,097 B2 | 1/2003 | Archambault | |
| 6,511,009 B1 | 1/2003 | Harrison et al. | |
| 6,522,826 B2 | 2/2003 | Gregory | |
| 6,616,080 B1 | 9/2003 | Edwards et al. | |
| 6,625,374 B2 | 9/2003 | Holman et al. | |
| 6,640,041 B2 | 10/2003 | Ichinari et al. | |
| 6,661,961 B1 | 12/2003 | Allen et al. | |
| 6,669,129 B1 | 12/2003 | Shah | |
| 6,721,484 B1 | 4/2004 | Blankenship et al. | |
| 6,834,517 B1 | 12/2004 | Sheehy, Jr. | |
| 6,915,058 B2 | 7/2005 | Pons | |
| 6,926,449 B1 | 8/2005 | Keenum et al. | |
| 6,933,441 B2 | 8/2005 | Fuller et al. | |
| 6,937,725 B2 | 8/2005 | Liao | |
| 6,948,680 B2 | 9/2005 | Ganster | |
| 6,997,410 B1 | 2/2006 | Huang | |
| 7,000,863 B2 | 2/2006 | Bethea et al. | |
| 7,011,538 B2 | 3/2006 | Chang | |
| 7,016,590 B2 | 3/2006 | Tanaka et al. | |
| 7,017,721 B1 | 3/2006 | Bradford et al. | |
| 7,044,278 B2 | 5/2006 | Cleveland | |
| 7,220,144 B1 | 5/2007 | Elliot et al. | |
| 7,266,283 B2 | 9/2007 | Kline et al. | |
| 7,315,681 B2 | 1/2008 | Kewitsch | |
| 7,346,253 B2 | 3/2008 | Bloodworth et al. | |
| 7,364,108 B2 | 4/2008 | Kim et al. | |
| 7,369,739 B2 | 5/2008 | Kline et al. | |
| 7,400,814 B1 | 7/2008 | Hendrickson et al. | |
| 7,522,806 B2 | 4/2009 | Hendrickson et al. | |
| 7,546,018 B2 | 6/2009 | Hendrickson et al. | |
| 7,548,679 B2 | 6/2009 | Hirano et al. | |
| 7,715,679 B2 | 5/2010 | Kowalczyk et al. | |
| 2001/0048044 A1 | 12/2001 | Sugata | |
| 2002/0023814 A1 | 2/2002 | Poutiatine | |
| 2002/0164121 A1 | 11/2002 | Brennan, III et al. | |
| 2002/0171002 A1 | 11/2002 | Kretsch et al. | |
| 2003/0037480 A1 | 2/2003 | Davis | |
| 2004/0170369 A1 | 9/2004 | Pons | |
| 2004/0244430 A1 | 12/2004 | Sheehy, Jr. | |
| 2005/0213920 A1 | 9/2005 | Tanaka et al. | |
| 2005/0247136 A1 | 11/2005 | Cross et al. | |
| 2005/0258411 A1 | 11/2005 | Zeitler | |
| 2006/0163403 A1 | 7/2006 | Dickson | |
| 2006/0183362 A1 | 8/2006 | Mullaney et al. | |
| 2006/0210230 A1 | 9/2006 | Kline et al. | |
| 2008/0035778 A1 | 2/2008 | Belden et al. | |
| 2008/0037945 A1 | 2/2008 | Gniadek et al. | |
| 2008/0315030 A1 | 12/2008 | Hendrickson et al. | |
| 2009/0060441 A1 | 3/2009 | Kowalczyk et al. | |
| 2009/0317047 A1 * | 12/2009 | Smith et al. | 385/135 |

FOREIGN PATENT DOCUMENTS

| | | | |
|---|---|---|---|
| EP | 1 107 031 A1 | | 6/2001 |
| FR | 2 566 997 A1 | | 1/1986 |
| JP | 4-323605 A | * | 11/1992 |
| JP | 9-68616 A | * | 3/1997 |
| JP | 9-236709 | | 9/1997 |
| JP | 11-349230 | | 12/1999 |
| JP | 2003-29053 A | * | 1/2003 |
| JP | 2003-114339 | | 4/2003 |
| JP | 2005-73365 | | 3/2005 |
| JP | 2005-249858 | | 9/2005 |

OTHER PUBLICATIONS

"V-Linx™ EZ-Spool Terminal", Furukawa Electric North America, Copyright © 2007.

7 Inch Modules, ADC Telecommunications, Inc, © 1998, "7 Inch Connector Module with IFC", pp. 127.

Description of Admitted Prior Art, 30 pages.

F3DF Modules, ADC Telecommunications, Inc. © 1995, "Individual 12-Pack Assemblies", pp. 90.

Fiber Cable Management Products, Third Edition, ADC Telecommunications, Inc., © 1995, 1998.

Fiber Distribution Frame, Pre-Terminated Rear Load Connector Module, Installation Instructions, ADC Telecommunications, Inc., © 2000.

Fiber Main Distribution Frame (FMDF), Fiber Terminal Block, Installation Instructions, ADC Telecommunications, Inc., © 2001.

Fiber Panel Products—Cable Management Tray Panels, ADC Telecommunications, Inc., © 1994, 1996 "72 Fiber Distribution Module (FDM) with Intrafacility Fiber Cable", pp. 56.

Fiber Panel Products, Second Edition, ADC Telecommunications, Inc., © 1994, 1996.

FL2000 Products—Preconfigured Panels, ADC Telecommunications, Inc., © 2000 "Rack or Cabinet Mount Termination Panel with Multifiber Cable", pp. 13.

FL2000 Products, ADC Telecommunications, Inc., © 1994, 1996.

FL2000 Products, ADC Telecommunications, Inc., © 1994, 1996, "Rack Mount Panel with Intrafacility Fiber Cable", pp. 16.

IFC Style Frame Modules, ADC Telecommunications, Inc., © 1995, "Connector Module Equipped with IFC", pp. 27.

International Search Report and Written Opinion cited in International Application No. PCT/US2008/062764 mailed Aug. 8, 2008.

International Search Report and Written Opinion cited in International Application No. PCT/US2008/075196 mailed Nov. 18, 2008.

International Search Report and Written Opinion cited in International Application No. PCT/US2008/072218 mailed Mar. 18, 2009.

International Search Report and Written Opinion cited in International Application No. PCT/US2009/057077 mailed May 13, 2010.

Next Generation Frame (NGF), Product Family Ordering Guide, ADC Telecommunications, Inc., © 1996, 1999, 2000, "Fiber Termination Blocks (FTB) Preterminated", pp. 8.

Next Generation Frame (NGF), Product Family Ordering Guide, ADC Telecommunications, Inc., © 1996, 1999, 2000.

Next Generation Frames—Fiber Termination Blocks, ADC Telecommunication, Inc., © 1998, "Fiber Termination Blocks (FTB) Preterminated" pp. 6.

Value-Added Module System, ADC Telecommunications, Inc., © 1993, 1994, 1998, "12-Pack Module Assemblies", pp. 30-31.

* cited by examiner

MODULAR FIBER OPTIC ENCLOSURE WITH EXTERNAL CABLE SPOOL

CROSS-REFERENCE TO RELATED APPLICATIONS

The present application claims priority to U.S. Provisional Patent Application Ser. No. 61/097,536 entitled "Modular Fiber Optic Enclosure with External Cable Spool" and filed on Sep. 16, 2008. The above identified disclosure is hereby incorporated by reference in its entirety.

BACKGROUND

As demand for telecommunications increases, fiber optic networks are being extended in more and more areas. In facilities such as multiple dwelling units, apartments, condominiums, businesses, etc., fiber optic enclosures are used to provide a subscriber access point to the fiber optic network. These fiber optic enclosures are connected to the fiber optic network through subscriber cables connected to a network hub. However, the length of subscriber cable needed between the fiber optic enclosure and the network hub varies depending upon the location of the fiber optic enclosure with respect to the network hub. As a result, there is a need for a fiber optic enclosure that can effectively manage varying lengths of subscriber cable.

SUMMARY

An aspect of the present disclosure relates to a fiber optic enclosure assembly. The fiber optic enclosure includes an enclosure that is adapted to optically connect incoming fibers to outgoing fibers. A cable spool is connected to an exterior of the enclosure. A cable having the incoming fibers is disposed about the cable spool. The cable spool includes a strain relief post about which the cable is wrapped.

Another aspect of the present disclosure relates to a fiber optic enclosure including a housing and a cable spool assembly. The housing includes a main body and a cover mounted to the main body. The cover and the main body cooperatively define an interior region. The cable spool assembly is connected to an exterior of the housing. The cable spool assembly includes a drum portion and a strain relief post.

Another aspect of the present disclosure relates to a fiber optic enclosure including a housing and a cable spool mounting assembly connected to an exterior of the housing. The housing includes a main body and a cover mounted to the main body. The cover and the main body cooperatively defining an interior region. The cable spool mounting assembly including a cable spool assembly and a mounting plate. The cable spool assembly includes an enclosure mount and a flange. The enclosure mount includes a first face and an oppositely disposed second face. The first face includes a drum portion that extends outwardly from the first face. The second face includes a strain relief post. The second face is adapted to receive the housing. The flange is engaged with the drum portion. The mounting plate includes a spindle. The spindle is engaged to the drum portion of the cable spool assembly. The cable spool assembly is adapted to selectively rotate about the spindle.

Another aspect of the present disclosure relates to a fiber optic enclosure including a housing, a cable spool mounting assembly connected to an exterior of the housing, and a fiber optic cable. The housing includes a main body, a cover mounted to the main body, and a plurality of adapters. The cover and the main body cooperatively defining an interior region. The plurality of adapters is disposed in the interior region. The cable spool mounting assembly including a cable spool assembly and a mounting plate. The cable spool assembly includes an enclosure mount and a flange. The enclosure mount includes a first face and an oppositely disposed second face. The first face includes a drum portion that extends outwardly from the first face. The second face is adapted to receive the housing. The second face includes a strain relief post. The flange is engaged with the drum portion. The mounting plate includes a spindle. The spindle is engaged to the drum portion of the cable spool assembly. The cable spool assembly is adapted to selectively rotate about the spindle. The fiber optic cable is wrapped about the drum portion of the cable spool assembly. The fiber optic cable includes an end portion that is wrapped around the strain relief post before entering the interior region.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

DRAWINGS

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

Figure 1:
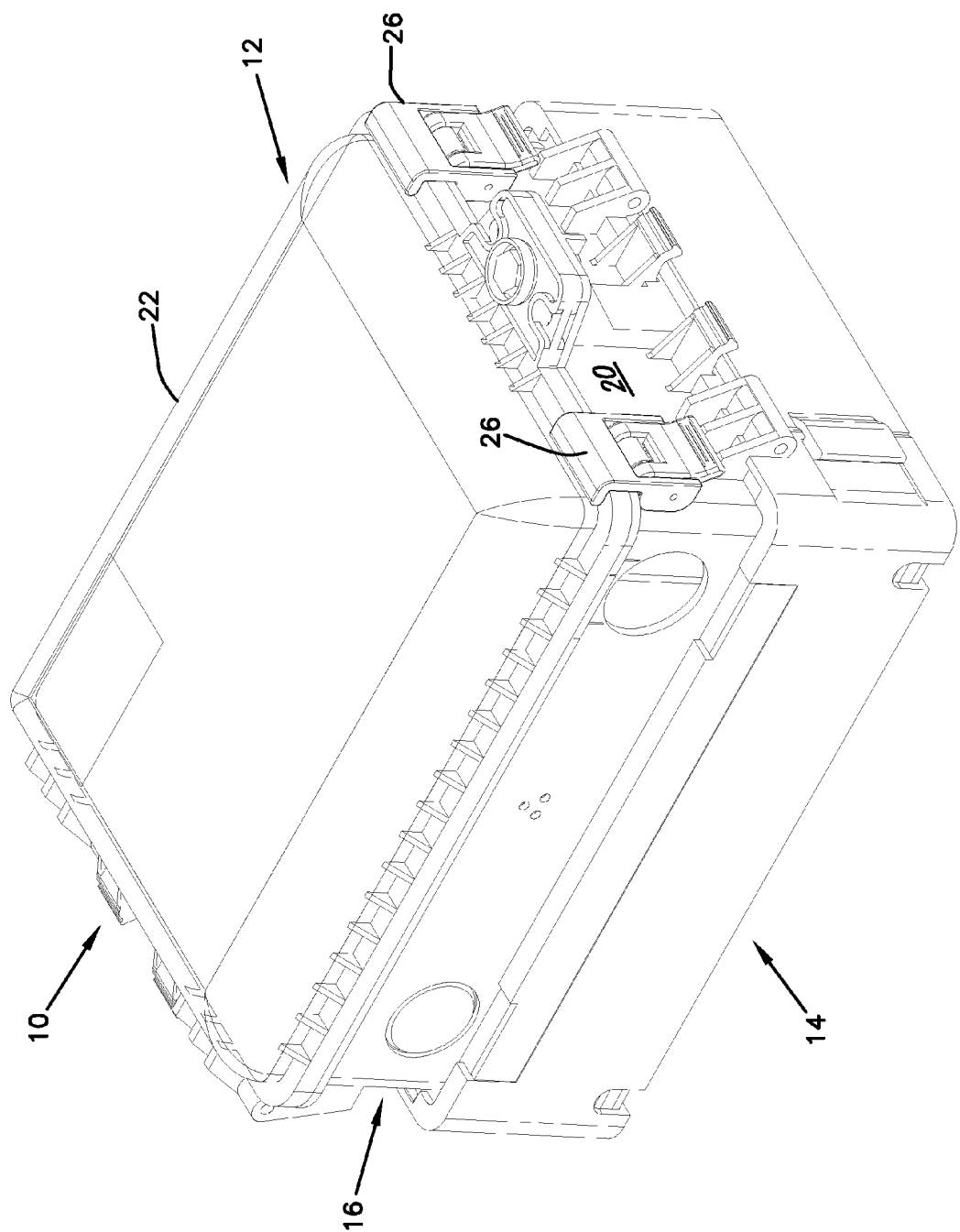
FIG. 1 is a perspective view of a fiber optic enclosure having features that are examples of aspects in accordance with the principles of the present disclosure.
Figure 2:
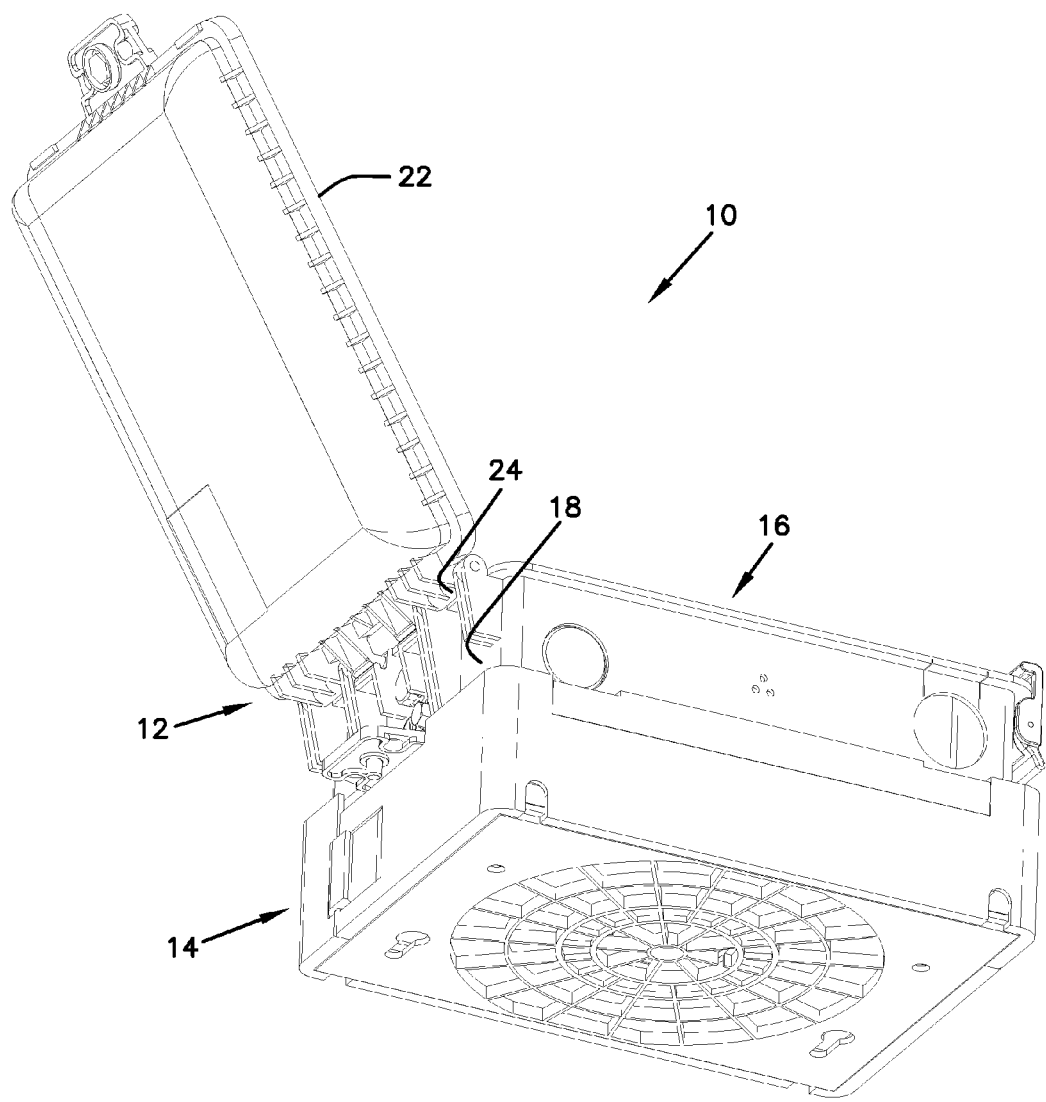
FIG. 2 is perspective view of the fiber optic enclosure of FIG. 1 with a cover in an open position.
Figure 3:
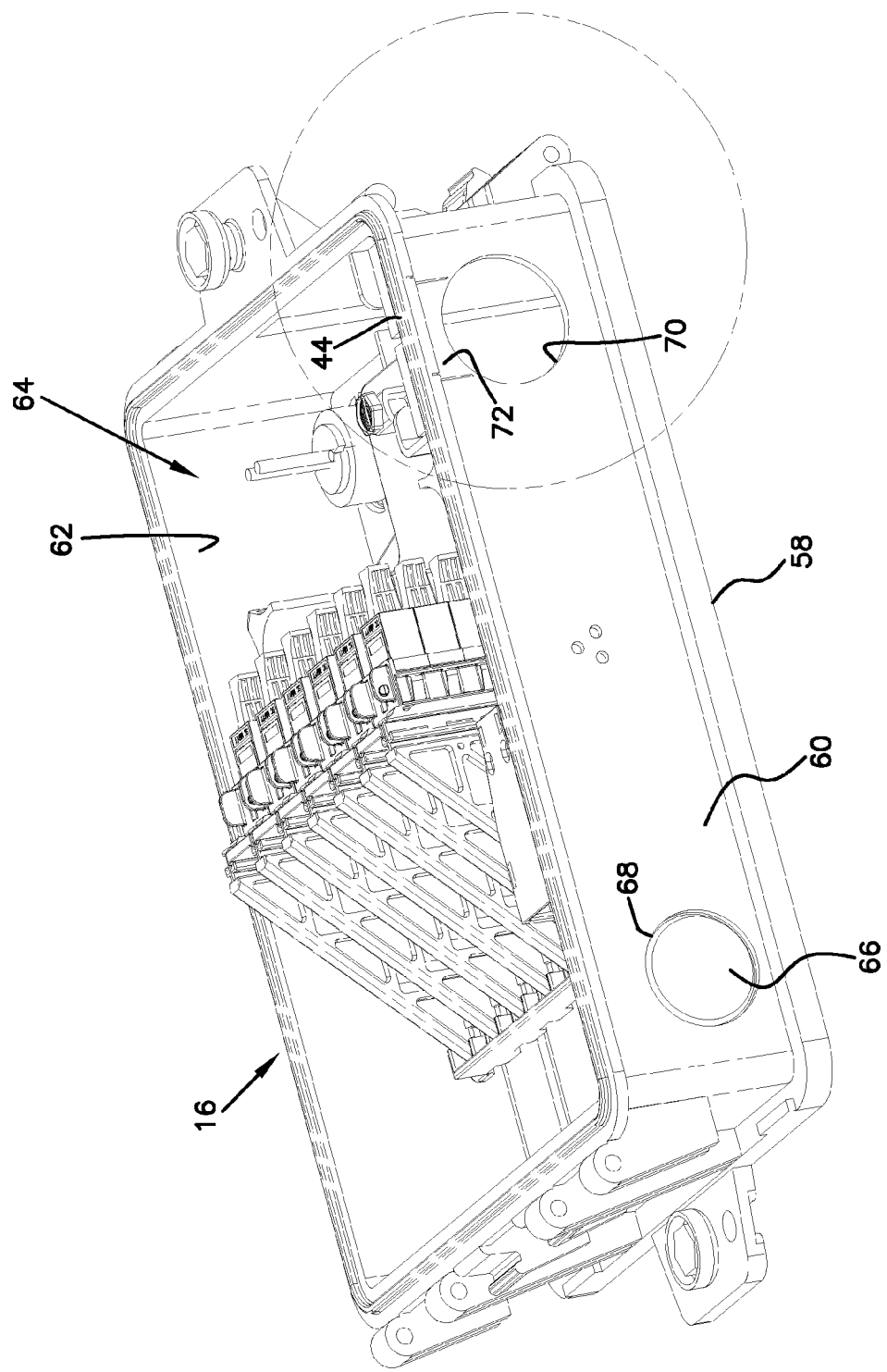
FIG. 3 is perspective view of a main body of the fiber optic enclosure of FIG. 1.
Figure 4:
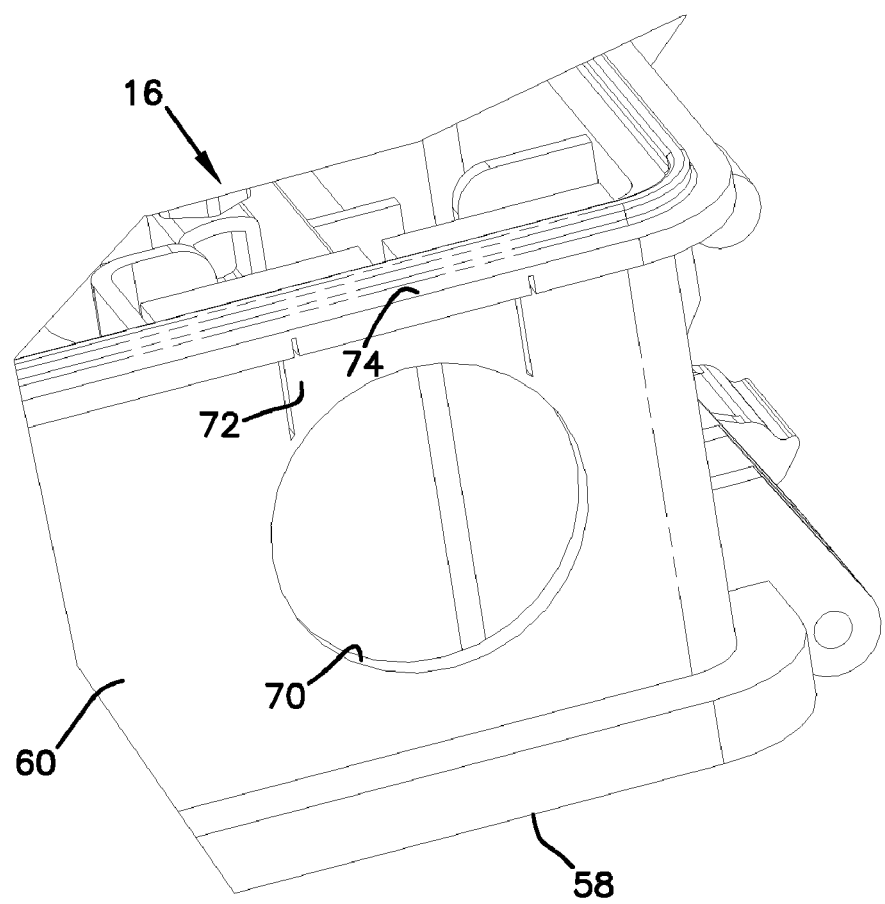
FIG. 4 is a fragmentary perspective view of the main body of FIG. 3.
Figure 5:
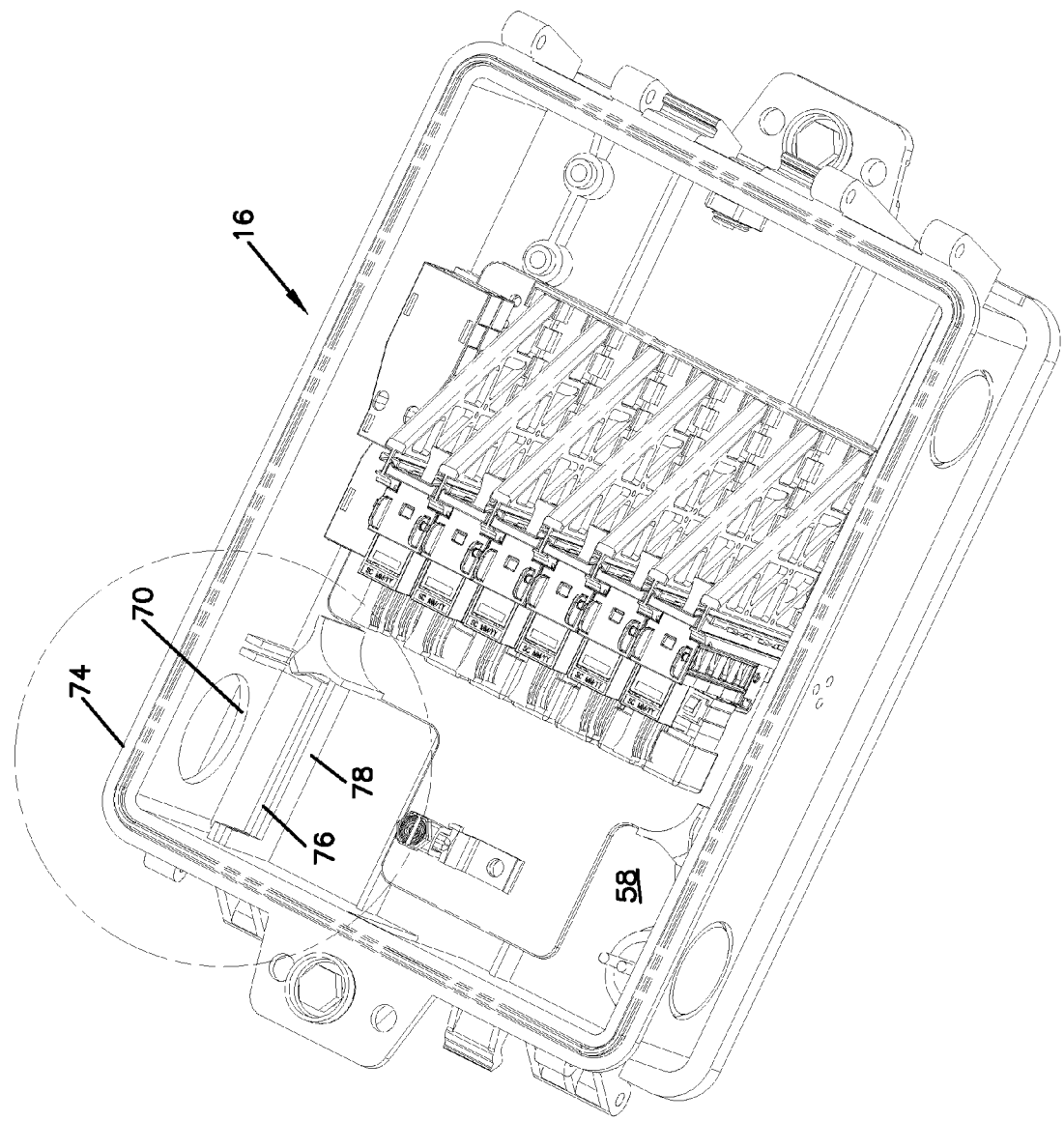
FIG. 5 is perspective view of the main body of FIG. 3
Figure 6:
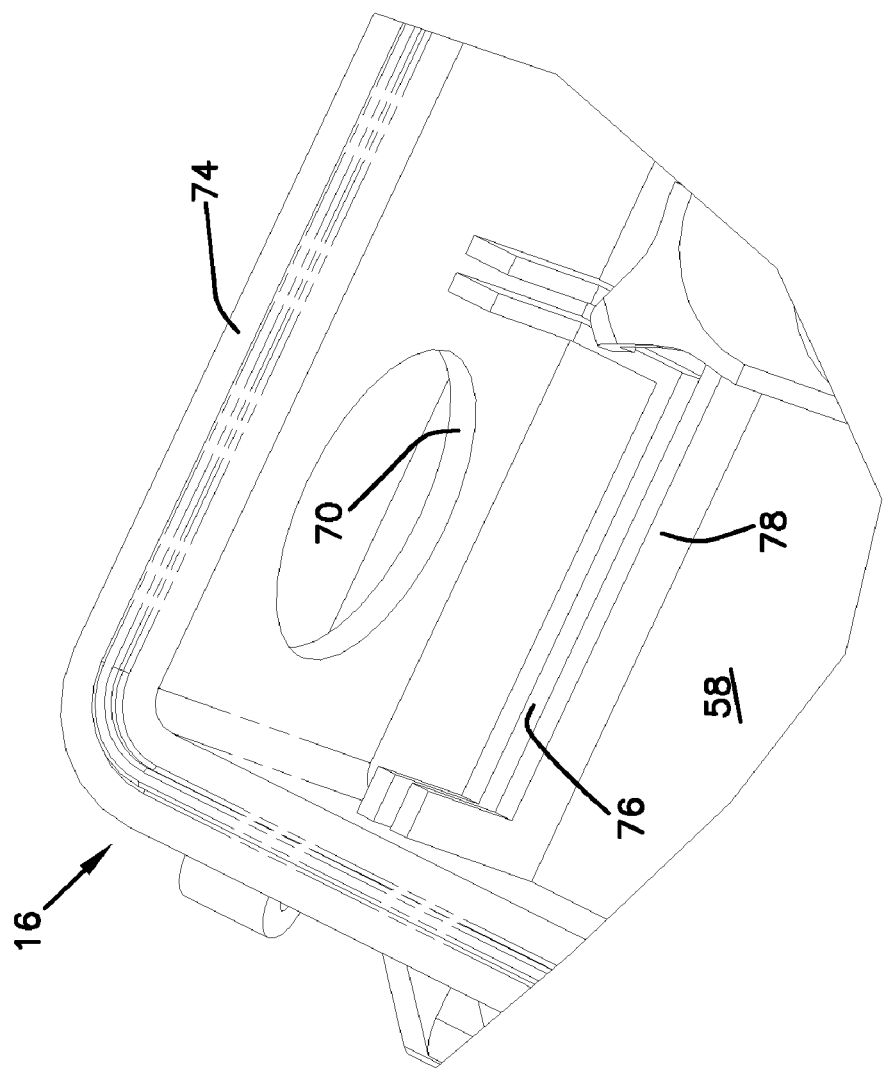
FIG. 6 is a fragmentary perspective view of the main body of FIG. 5.
Figure 7:
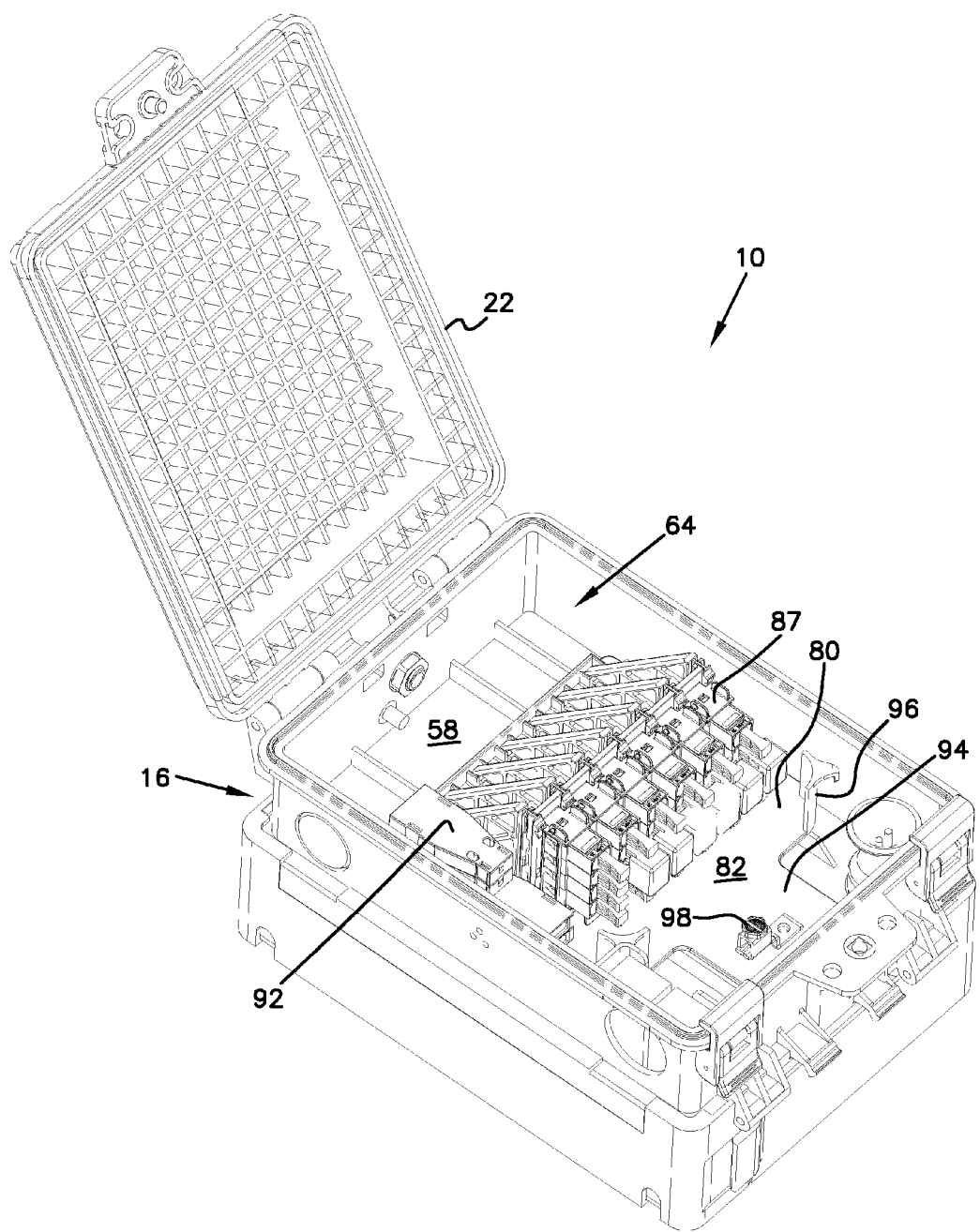
FIG. 7 is a perspective view of the fiber optic enclosure of FIG. 2.
Figure 8:
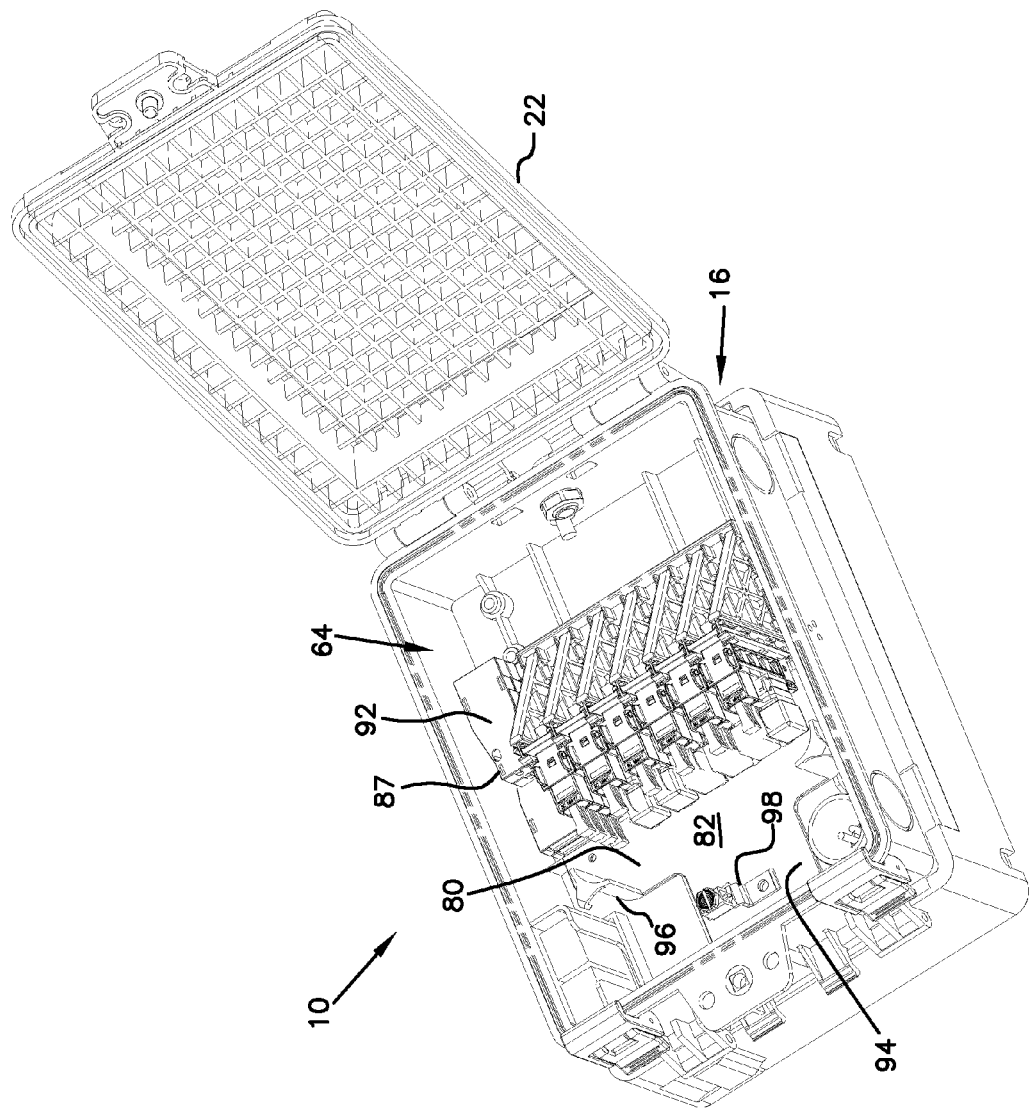
FIG. 8 is a perspective view of the fiber optic enclosure of FIG. 2.

Referring now to FIGS. 1 and 2, a fiber optic enclosure, generally designated 10 is shown. The fiber optic enclosure 10 includes a housing, generally designated 12, and a cable spool mounting assembly, generally designated 14.

The fiber optic enclosure 10 provides an enclosure from which lengths of subscriber cable can be dispensed following the mounting of the fiber optic enclosure 10 to a mounting location. The subscriber cable is dispensed from the fiber optic enclosure 10 by pulling on an end of the cable. As the cable is dispensed, the fiber optic enclosure 10 rotates about an axis relative to a stationary mounting plate of the fiber optic enclosure. In the event that there is a residual length of subscriber cable that was not dispensed, the fiber optic enclosure can store this residual length.

In the subject embodiment, the housing 12 is molded from a plastic material. In the depicted embodiment of FIGS. 1 and 2, the housing 12 includes a main body, generally designated 16, having a first sidewall 18 and an oppositely disposed second sidewall 20. The housing 12 further includes a cover 22 that is pivotally engaged to the main body 16. In the subject embodiment, the cover 22 is pivotally engaged with the main body 16 by a hinge 24 disposed on the first sidewall 18. The hinge 24 allows the cover 22 to selectively pivot between a closed position (shown in FIG. 1) and an open position (shown in FIG. 2).

In the depicted embodiment of FIGS. 1 and 2, a plurality of latches 26 is disposed on the second sidewall 20 of the main body 16. The plurality of latches 26 is adapted to secure the cover 22 in the closed position. Each of the plurality of latches 26 includes a latching member 28 that is adapted to receive a portion of an exterior edge portion 30 on the cover 22 and to secure the cover 22 to the main body 16.

Referring now to FIGS. 3-6, the main body 16 further includes a base wall 58, a first wall 60 and an opposite second wall 62. The first and second walls 60 and 62 extend outwardly from the base wall 58 between the first and second sidewalls 18, 20. The base wall 58, the first and second walls 60 and 62 and the first and second sidewalls 18, 20 cooperatively define an interior region 64.

In the subject embodiment, the first wall 60 includes a punch out 66. The punch out 66 defines an area of weakness 68 that allows for the selective removal of the punch out 66. With the punch out 66 removed, the first wall 60 defines a cable opening 70 through which a telecommunications cable can enter the interior region 64 of the main body 16 of the housing 12. In the depicted embodiment of FIGS. 3 and 4, the first wall 60 further includes a break out 72 that extends from the cable opening 70 through an edge 74 of the first wall 60. With the break out 72 removed, the cable opening 70 extends through the edge 74 of the main body 16 thereby allowing for a telecommunications cable to be laterally inserted into the interior region 64 rather than having to be inserted axially through the cable opening 70.

A channel 76 is formed from protrusions 78 from the base wall 58 in the interior region 64 of the main body 16. This channel 76 is adapted to hold a retaining wall in place near the cable opening 40 so that a compressible material can be retained adjacent to the cable opening 70 in order to provide a seal about the telecommunications cable entering the interior region 64.

Referring now to FIGS. 7-10, a termination tray 80 is disposed in the interior region 64 of the main body 16. The termination tray 80 includes a first surface 82 and an oppositely disposed second surface 84. The termination tray 80 is in engagement with the base wall 58 of the main body 16. In the subject embodiment, the termination tray 80 is in snap-fit engagement with the base wall 58 of the main body 16. A plurality of snap-fit latches 85 extend outwardly from the second surface 84 of the termination tray 80 and are adapted for engagement with corresponding latches extending outwardly from the base wall 58 of the main body 16.

Figure 10:
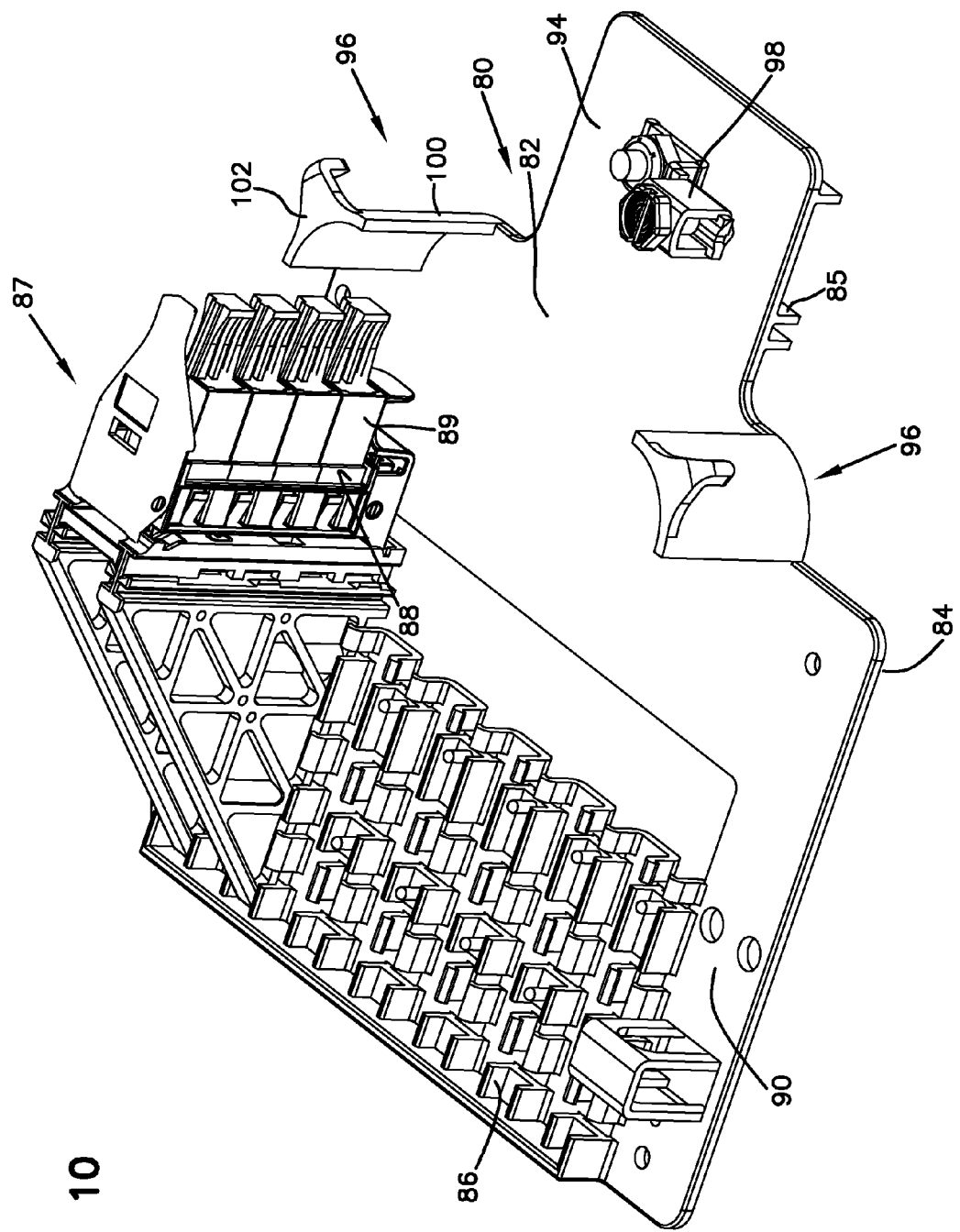
FIG. 10 is a perspective view of a termination tray suitable for use in the fiber optic enclosure of FIG. 1.

The first surface 82 of the termination tray 80 includes a plurality of adapter mounts 86 (best shown in FIG. 10). In the subject embodiment, the adapter mounts 86 are adapted to receive sliding adapter modules 87 in snap-fit engagement. Similar sliding adapter modules have been described in commonly owned U.S. Pat. Nos. 5,497,444; 5,717,810; 6,591,051 and U.S. Pat. Pub. No. 2007/0025675, the disclosures of which are hereby incorporated by reference in their entirety.

Each of the sliding adapter modules 87 defines a plurality of slots 88. In the depicted embodiment of FIG. 10, each of the sliding adapter modules 87 includes 4 slots 88. The plurality of slots 88 is adapted to receive a plurality of adapters 89. The plurality of adapters 89 is disposed in a linear array in the plurality of sliding adapter modules 87.

An opening of each of the slots 88 has a width and a height. In the depicted embodiment of FIG. 10, the width of the opening of the slot 88 is greater than the height of the opening of the slot 88.

Figure 11:
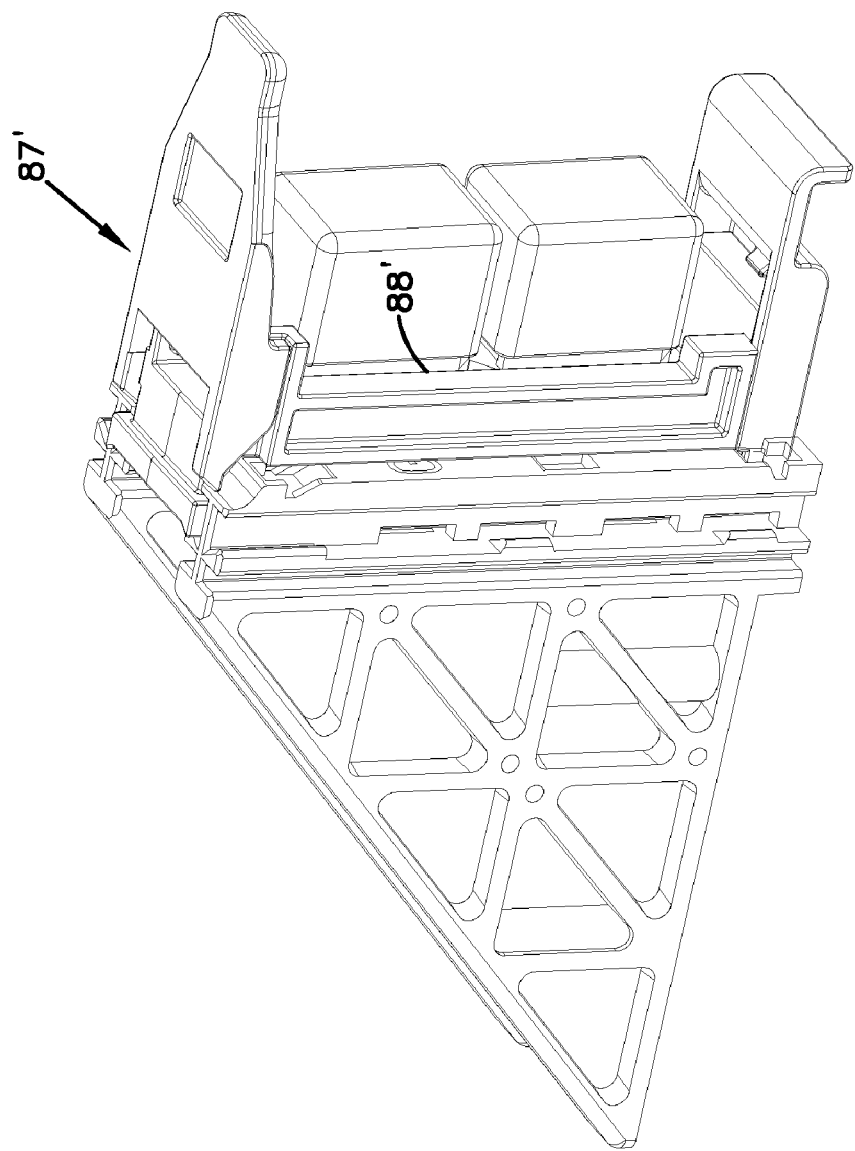
FIG. 11 is a perspective view of an alternate embodiment of an adapter module suitable for use with the termination tray of FIG. 10.
Figure 12:
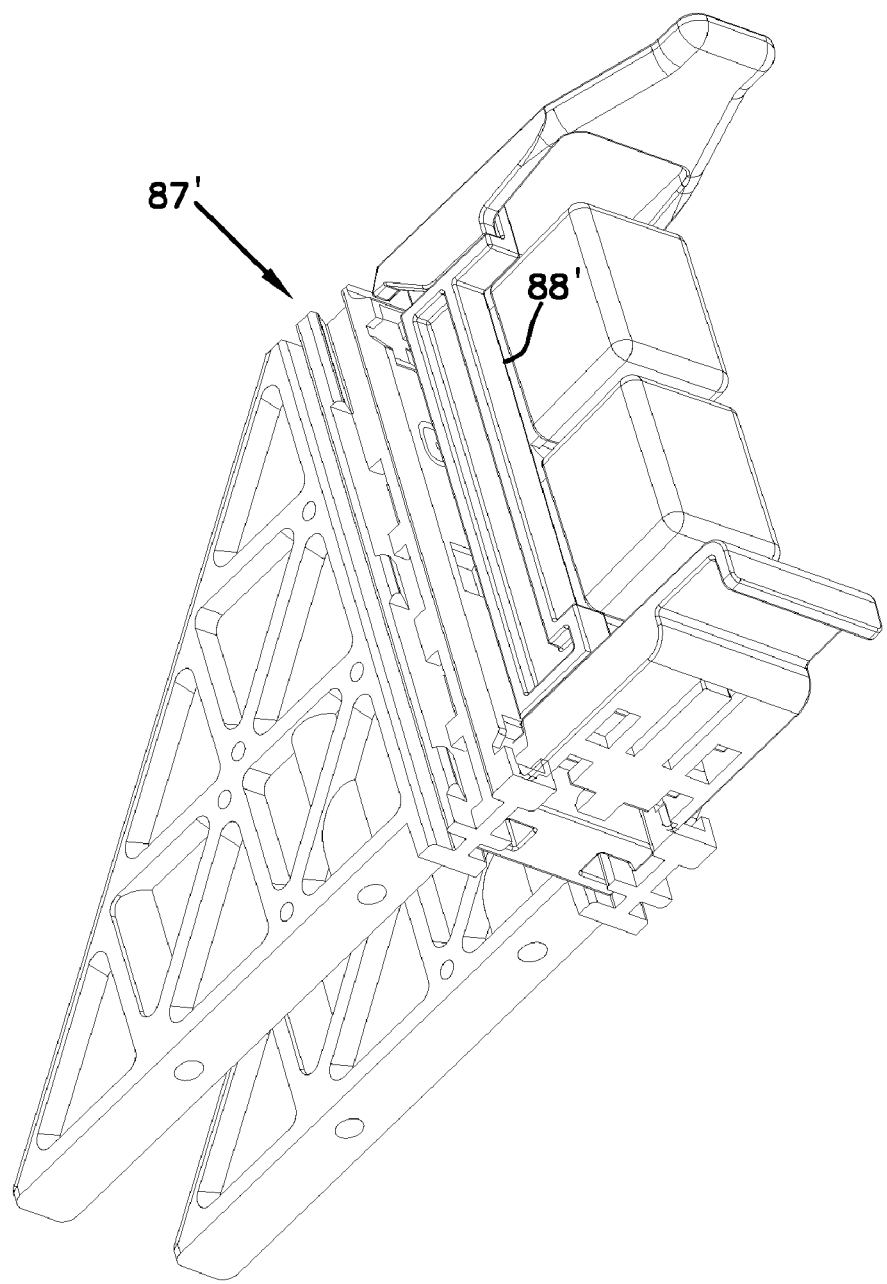
FIG. 12 is a perspective view of the adapter module of FIG. 11.

Referring now to FIGS. 11 and 12, an alternate embodiment of a sliding adapter module 87' is shown. The sliding adapter module 87' includes a plurality of slots 88'. In the depicted embodiment of FIG. 11, the sliding adapter module 87' includes two slots 88'. An opening of each of the plurality of slots 88' has a width and a height. In the depicted embodiment of FIG. 11, the height of the opening of the slot 88' is greater than the width of the opening of the slot 88'.

Referring again to FIGS. 7-10, the first surface 82 of the termination tray 80 further includes a fan-out mount 90 (best shown in FIG. 12). In the subject embodiment, the fan-out mount 90 is disposed adjacent to the adapter mounts 86. In the subject embodiment, the fan-out mount 90 is adapted to receive at least one fan-out 92 on the termination tray 80 in snap-fit engagement. In the subject embodiment, the fan-out mount 80 is adapted to retain four fan-outs 92.

The first surface 92 of the termination tray 80 further includes a cable management area 94. The cable management area 94 includes a plurality of bend radius protectors 96 and a cable clamp 98. The bend radius protectors 96 extend outwardly from the first surface 82 of the termination tray 80. In the subject embodiment, the bend radius protectors 96 are integral protrusions from the first surface 82 of the termination tray 80. The bend radius protectors 96 include a radius portion 100 and an extension portion 102. In the subject embodiment, the radius portion 100 extends outwardly from the first surface 82 in a generally perpendicular direction. The extension portion 102 is adapted to retain cable around the bend radius protectors 96. The extension portion 102 extends outwardly from the radius portion 100 in a direction that is generally parallel with the first surface 82 of the termination tray 80.

In the subject embodiment, the cable clamp 98 of the termination tray 80 is adapted to retain a cable on the termination tray 80. This is potentially advantageous as it prevents the connectorized ends of the cable from becoming dislocated from the sliding adapter modules 87 in the event that tension is applied to the cable.

In the subject embodiment, the termination tray 80 is molded from a plastic material. As a molded plastic part, the snap-fit latches, the adapter mounts 86, the fan-out mount 90 and the bend radius protectors 96 are integral with the termination tray 80. The snap-fit engagement features of the termination tray 80 are potentially advantageous as these features reduce the number of screws required to attach the corresponding components to the termination tray 80.

Figure 9:
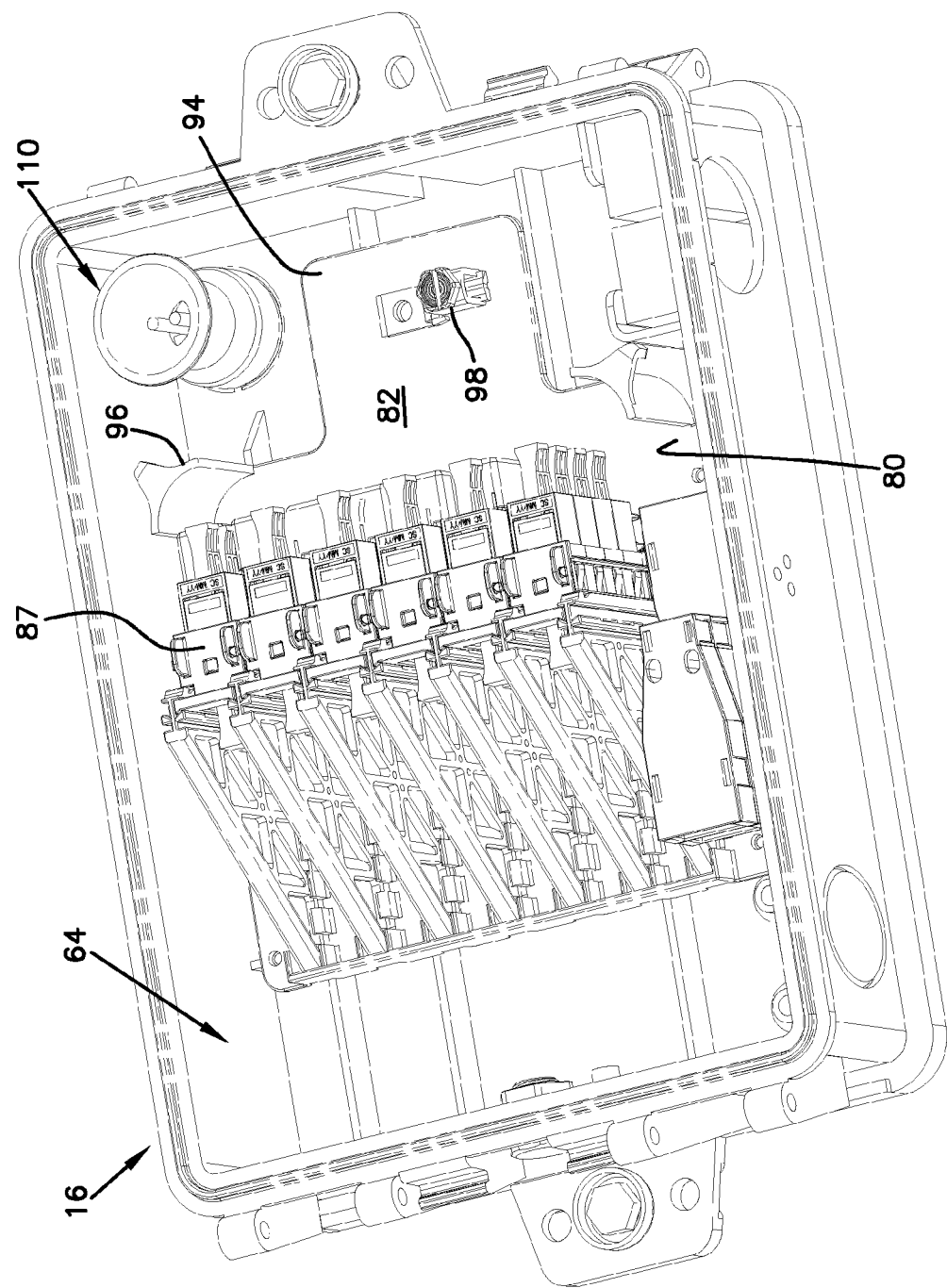
FIG. 9 is perspective view of the main body of the fiber optic enclosure of FIG. 1.
Figure 13:
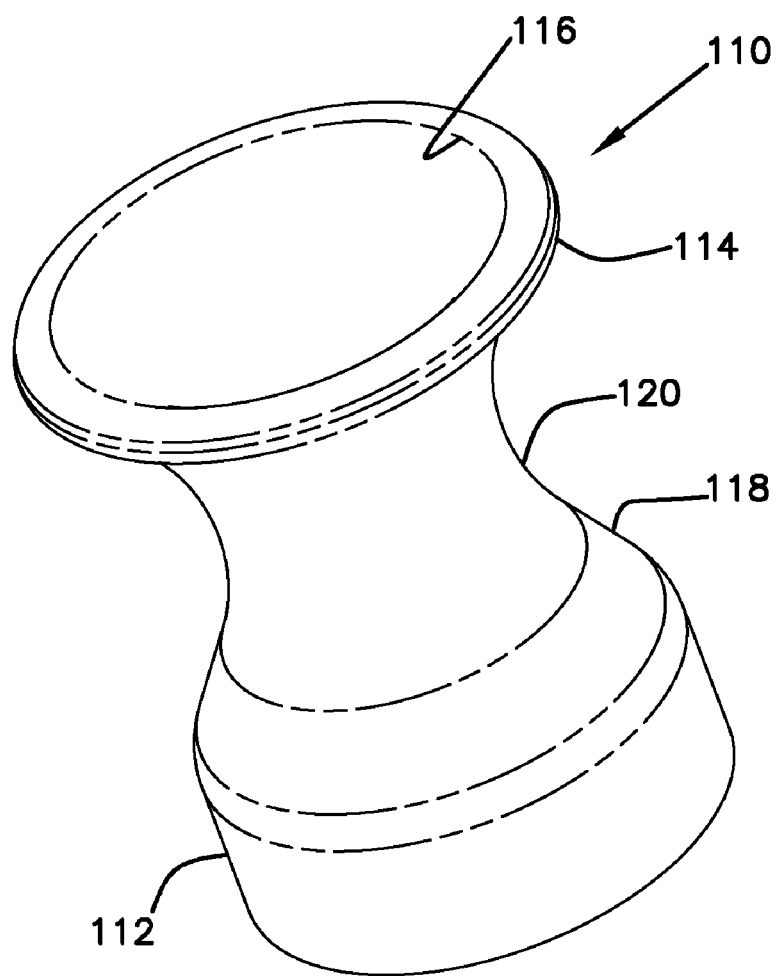
FIG. 13 is a perspective view of a bend radius protector suitable for use in the fiber optic enclosure of FIG. 1.
Figure 14:
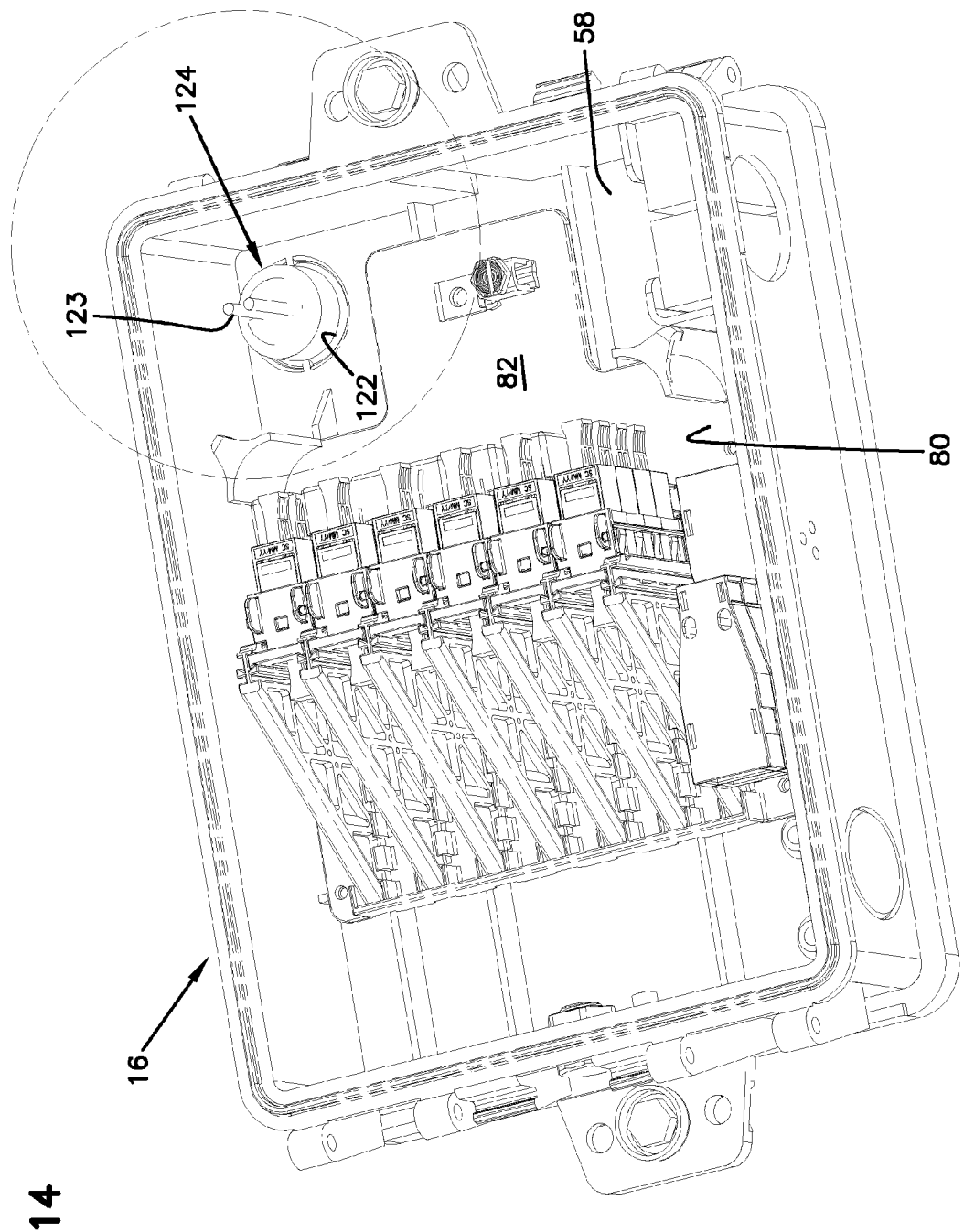
FIG. 14 is a perspective view of the main body of FIG. 9 with the bend radius protector removed.

Referring now to FIGS. 9 and 13, a bend radius protector 110 is shown. In the subject embodiment, the bend radius protector 110 is generally cylindrical in shape and includes a first axial end 112 and an opposite second axial end 114. The bend radius protector 110 defines a central opening 116 that extends through the first and second axial ends 112, 114.

The bend radius protector 110 further includes an outer surface 118. The outer surface 118 defines a groove 120 having a generally concave shape.

Referring now to FIGS. 9 and 13-15, the first axial end 112 of the bend radius protector 110 is adapted to engage a cable entry opening 122 (shown in FIGS. 14 and 15) in the base wall 58 of the main body 16. The cable entry opening 122 is adapted to provide access into the interior region 64 of the main body 16 for cable 123 (shown in FIGS. 14 and 15) from the cable spool mounting assembly 14. In addition to the bend radius protection offered by the concave shaped groove 120, the central opening 116 of the bend radius protector 110 tapers outwardly at the second axial end 114 to prevent any damage to the cable as it passes from the cable entry opening 122 into the interior region 64.

Figure 15:
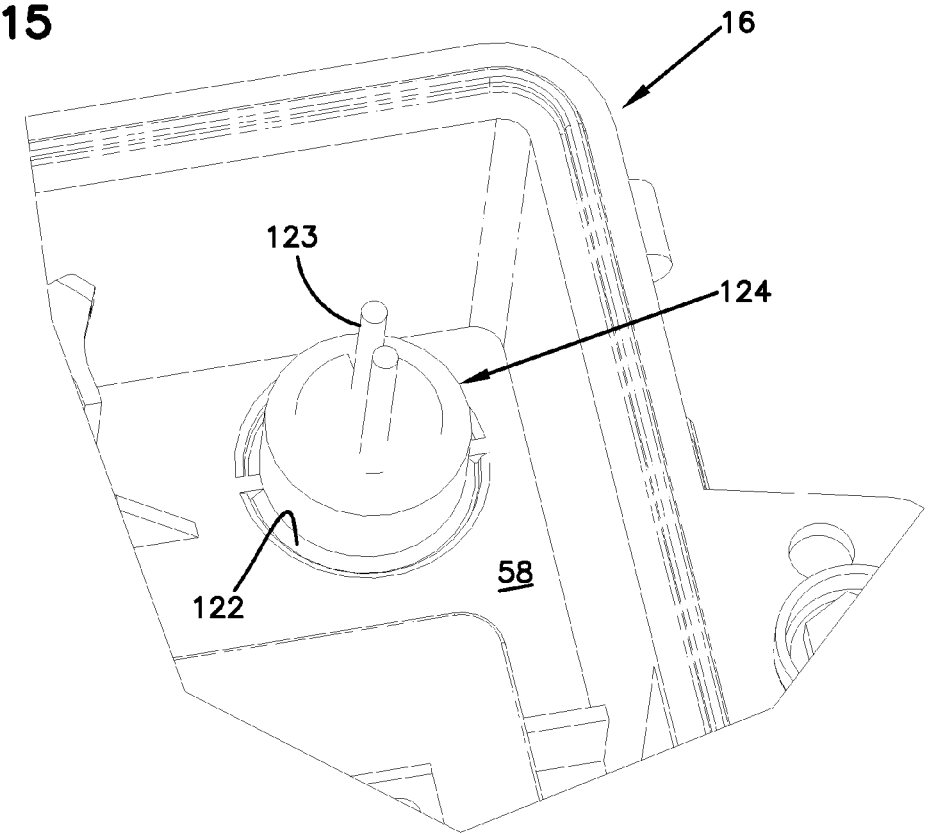
FIG. 15 is a fragmentary perspective view of the main body of FIG. 14.
Figure 16:
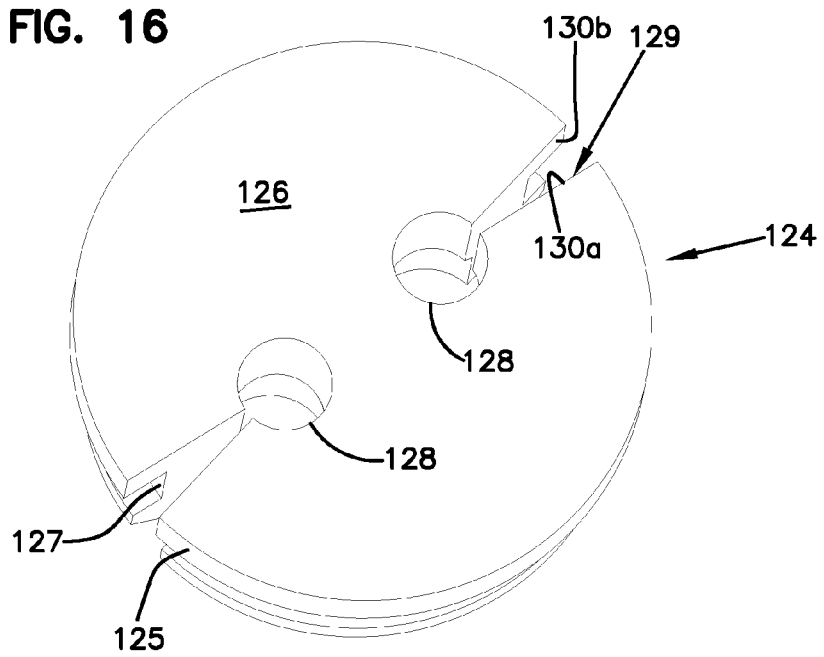
FIG. 16 is a perspective view of a grommet suitable for use with the fiber optic enclosure of FIG. 1.

Referring now to FIGS. 15 and 16, in an alternate embodiment, a grommet 124 is adapted for disposition in the cable entry opening 122 of the base wall 58. The grommet 124 is adapted to provide sealing engagement between the cable from the cable spool mounting assembly 14 and the cable entry opening 122. In the subject embodiment, the grommet 124 includes an outer circumferential surface 125 and an end surface 126.

The outer circumferential surface 125 defines a retention groove 127. The retention groove 127 is adapted to receive the base wall 58 of the main body 16 surrounding the cable entry opening 122.

The grommet 124 defines a plurality of thru-holes 128 that extends longitudinally through the grommet 124 and through the end surface 126. A slot 129 extends from the outer circumferential surface 125 of the grommet 124 to the thru-hole 128. The slot 129 is defined by a first side 130a and an oppositely disposed second side 130b. The slot 129 allows for the cable 123 from the cable spool mounting assembly 14 to be inserted longitudinally into the grommet 124. When the grommet 124 is disposed in the cable entry opening 122, the first and second sides 130a, 130b are pressed together thereby closing the slot 129.

Figure 18:
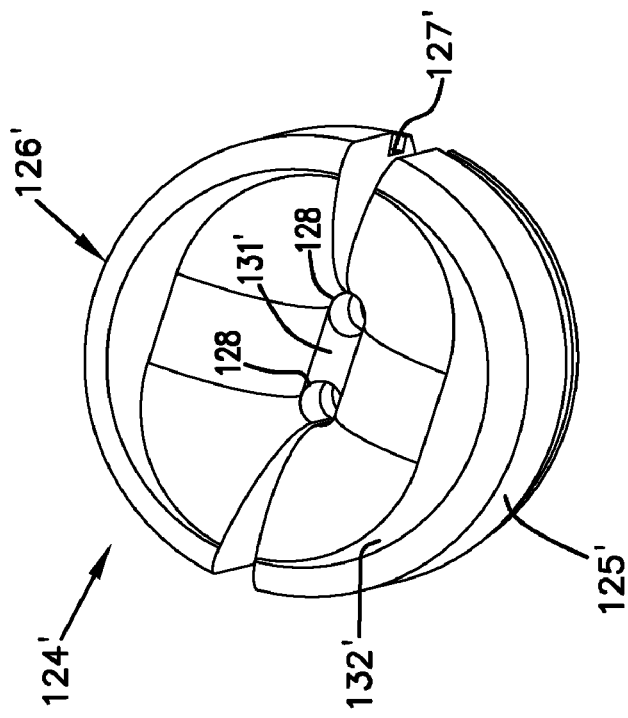
FIG. 18 is a perspective view of the grommet of FIG. 17.
Figure 17:
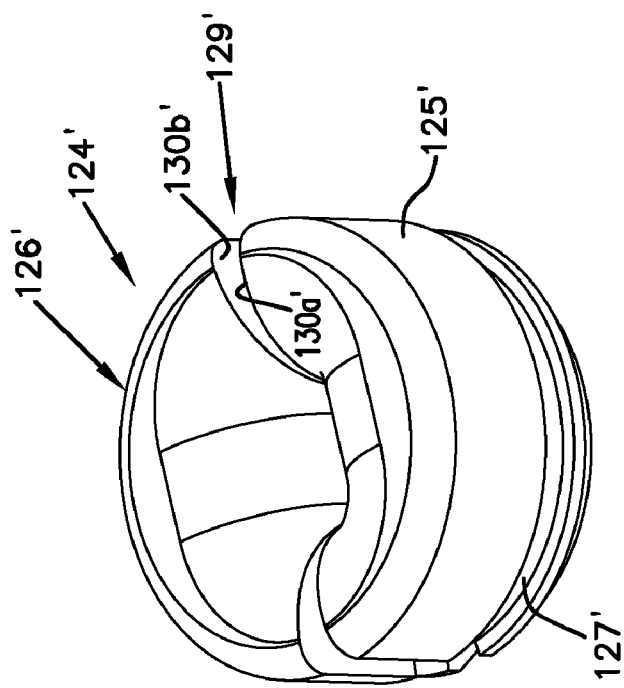
FIG. 17 is a perspective view of an alternate embodiment of a grommet suitable for use with the fiber optic enclosure of FIG. 1.

Referring now to FIGS. 17-18, an alternate embodiment of a grommet 124' is shown. The grommet 124' includes an outer circumferential surface 125' and an end surface 126'. The outer circumferential surface 125' defines a retention groove 127'. The retention groove 127' is adapted to receive the base wall 58 of the main body 16 surrounding the cable entry opening 122.

The grommet 124' defines a plurality of thru-holes 128' that extends longitudinally through the grommet 124' and through the end surface 126'. A slot 129' extends from the outer circumferential surface 125' of the grommet 124' to the thru-hole 128'. The slot 129' is defined by a first side 130a' and an oppositely disposed second side 130b'. When the grommet 124' is disposed in the cable entry opening 122, the first and second sides 130a', 130b' are pressed together thereby closing the slot 129'.

The end surface 126' of the grommet 124' includes a central portion 131' and an outer edge portion 132'. The central portion 131' is recessed from the outer edge portion 132'. In the depicted embodiment of FIGS. 17-18, a portion of the end surface 126' disposed between the central portion 131' and the outer edge portion 132' is arcuate in shape. The arcuate shape of the portion of the end surface 126' between the central portion 131' and the outer edge portion 132' is adapted to prevent any damage to the cable as it passes from the cable entry opening 122 into the interior region 64.

Referring now to FIGS. 19-22, the cable spool mounting assembly 14 is shown. The cable spool mounting assembly 14 includes a mounting plate 140, a cable spool assembly 142 and an enclosure mount 144.

In the subject embodiment, the mounting plate 140 is generally plate shaped and includes a first surface 146 and an opposite second surface 148. The mounting plate 140 is adapted for stationary mounting to a mounting location (e.g., a wall, a pole, etc.). The first surface 146 is adapted to engage the cable spool assembly 142. In the subject embodiment, the first surface 146 engages the cable spool assembly 142 so that the cable spool assembly 142 can rotate about a rotating axis 150.

The second surface 148 is adapted to engage the mounting location. A plurality of thru-mounts 152 is disposed through the mounting plate 140. These thru-mounts 152 are adapted to receive fasteners (e.g., screws, bolts, etc.) for engagement with the mounting location.

The cable spool assembly 142 includes an end 154 and a drum portion 158 that is disposed between the end 154 and the enclosure mount 144. The drum portion 158 is adapted for coiling or wrapping cable 123.

The end 154 of the cable spool assembly 142 is adapted for rotational engagement with the mounting plate 140. In the subject embodiment, a bearing is disposed between the end 154 and the mounting plate 140. A bearing suitable for use has been described in U.S. patent application Ser. No. 12/113,786, the disclosure of which is hereby incorporated by reference in its entirety.

The end 154 includes an end plate 160 and a spindle 162 that extends outwardly from the center of the end plate 160. The end plate 160 is generally circular in shape. In the subject embodiment, the end plate 160 includes a plurality of flats 164 that are oppositely dispose about the circumference of the end plate 160.

The end plate 160 defines a plurality of notches 166 that extend through the end plate 160 and that are arranged about a first axial end 168 of the spindle 162. In the subject embodiment, there are four notches 166 equally spaced about the first axial end 168 of the spindle 162.

In the subject embodiment, the spindle 162 is integral with the end 154 of the cable spool assembly 142. The spindle 162 includes the first axial end 168 and an oppositely disposed second axial end 170. The second axial end 170 includes a plurality of resilient latches 172 that are adapted for snap-fit engagement with the drum portion 158.

The drum portion 158 is generally cylindrical in shape and includes an outer surface 174 about which the cable 123 is coiled. The drum portion 158 further includes a first end portion 176 and an oppositely disposed second end portion 178. The drum portion 158 defines a central bore 180 that extends through the drum portion 158. In the subject embodiment, the central bore 180 is adapted to receive the spindle 162 of the end 154.

The first and second end portions 176, 178 include a plurality of resilient catches 182. The resilient catches 182 of the first end portion 176 are adapted for engagement in the notches 166 of the end 154 while the resilient catches 182 of the second end portion 178 are adapted for engagement with notches 184 in the enclosure mount 144.

The second end portion 178 of the drum portion 158 defines passage 186. The passage 186 provides a path from the outer surface 174 to the central bore 180. The passage 186 is adapted to provide a path through which an end of the cable 123 that is wrapped around the drum portion 158 can pass for access to the main body 16.

Each of a first wall 188 and an oppositely disposed second wall 190 of the passage 186 include a radius portion 192 that is adapted to prevent damage to the cable 123 resulting from bending.

The enclosure mount 144 includes a first face 200 and an opposite second face 202. The first face 200 is adapted for engagement with the drum portion 158. The second face 202 is adapted for engagement with the main body 16.

The second face 202 includes a strain relief post 204. The strain relief post 204 is disposed between the drum portion 158 of the cable spool assembly 142 and the interior region 64 of the housing 12. The strain relief post 204 is a generally cylindrical shaped protrusion that extends outwardly from the second face 202. In the subject embodiment, the strain relief post 204 is recessed so that the strain relief post 204 does not interfere with the main body 16 when the main body 16 is engaged with the cable spool mounting assembly 14.

The strain relief post 204 includes an outer surface 206 about which the cable 123 is wrapped. In the subject embodiment, the cable 123 is wrapped about the strain relief post 204 at least once.

The second face 202 further defines a cable guide 208. The cable guide 208 is a recessed groove that generally extends from the strain relief post 204 to a location adapted for alignment with the cable entry opening 122 of the base wall 58.

The second face 202 further defines a retention channel 210. In the subject embodiment, the retention channel 210 is adapted to receive the base wall 58 of the main body 16 and retain the base wall 58 in engagement with the enclosure mount 144.

The cable spool assembly 142 and the enclosure mount 144 are engaged so that the cable spool assembly 142 and the enclosure mount 144 unitarily rotate. As the cable spool assembly 142 is rotationally engaged with the mounting plate 140, the cable spool assembly 142 and the main body 16 selectively rotate in unison about the rotating axis 150 of the mounting plate 140 when the main body 16 is engaged in the enclosure mount 144. The selective rotation of the cable spool assembly 142 and the main body 16 about the rotating axis 150 dispenses subscriber cable 123 that is coiled or wrapped about the drum portion 158 of the cable spool assembly 142. This arrangement allows the fiber optic enclosure 10 to be mounted to a mounting location with one end of the subscriber cable 123 in connected engagement with the sliding adapter modules 87 in the interior region 64 of the main body 16 yet still allow for cable 123 to be dispensed from the fiber optic enclosure 10 without disrupting the connection between the fibers of the cable 123 and the adapters 89.

By wrapping the cable 123 about the outer surface 206 of the strain relief post 204, the cable 123 in the interior region 64 of the main body 16 is protected against over rotation of the cable spool assembly 142 and the main body 16 relative to the mounting plate 140. For example, with the mounting plate 140 rigidly mounted to a mounting location, if the cable spool assembly 142 and the main body 16 are rotated relative to the mounting plate 140 and the full length of cable 123 is dispensed during the rotation, the tension in the cable 123 will cause the cable spool assembly 142 and the main body 16 to quickly stop. If the strain relief post 204 was not used, this quick stop could result in dislocation of the fibers of the cable 123 from the adapters 89 in the interior region of the main body 16. The use of the strain relief post 204, however, prevents tension from being applied to the cable 123 between the strain relief post 204 and the adapters 89.

Figure 23:
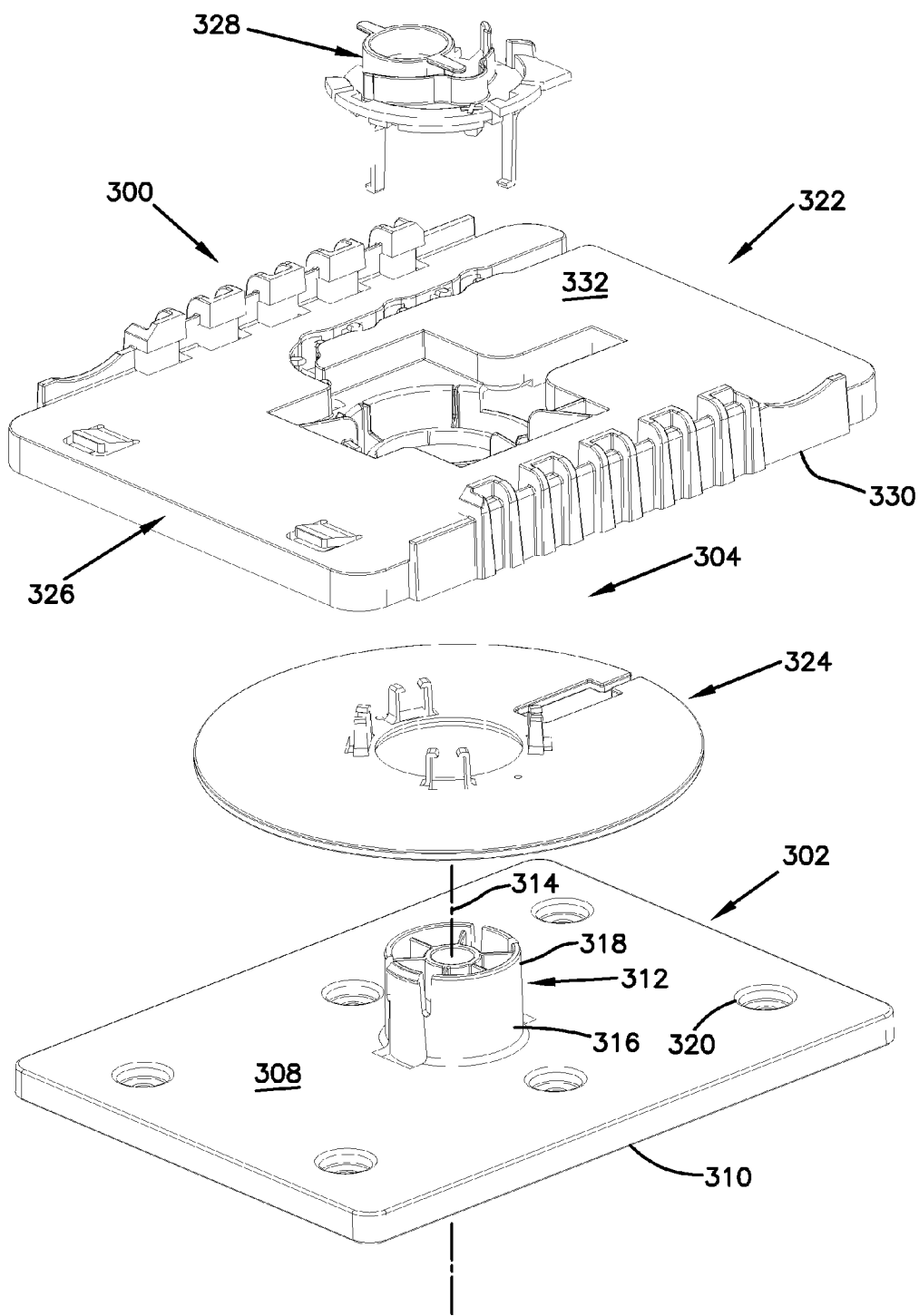
FIG. 23 is an exploded perspective view of an alternate embodiment of a cable spool mounting assembly suitable for use with the fiber optic enclosure of FIG. 1.

Referring now to FIG. 23, an alternate embodiment of a cable spool mounting assembly 300 is shown. The cable spool mounting assembly 300 includes a mounting plate 302 and a cable spool assembly 304.

Figure 24:
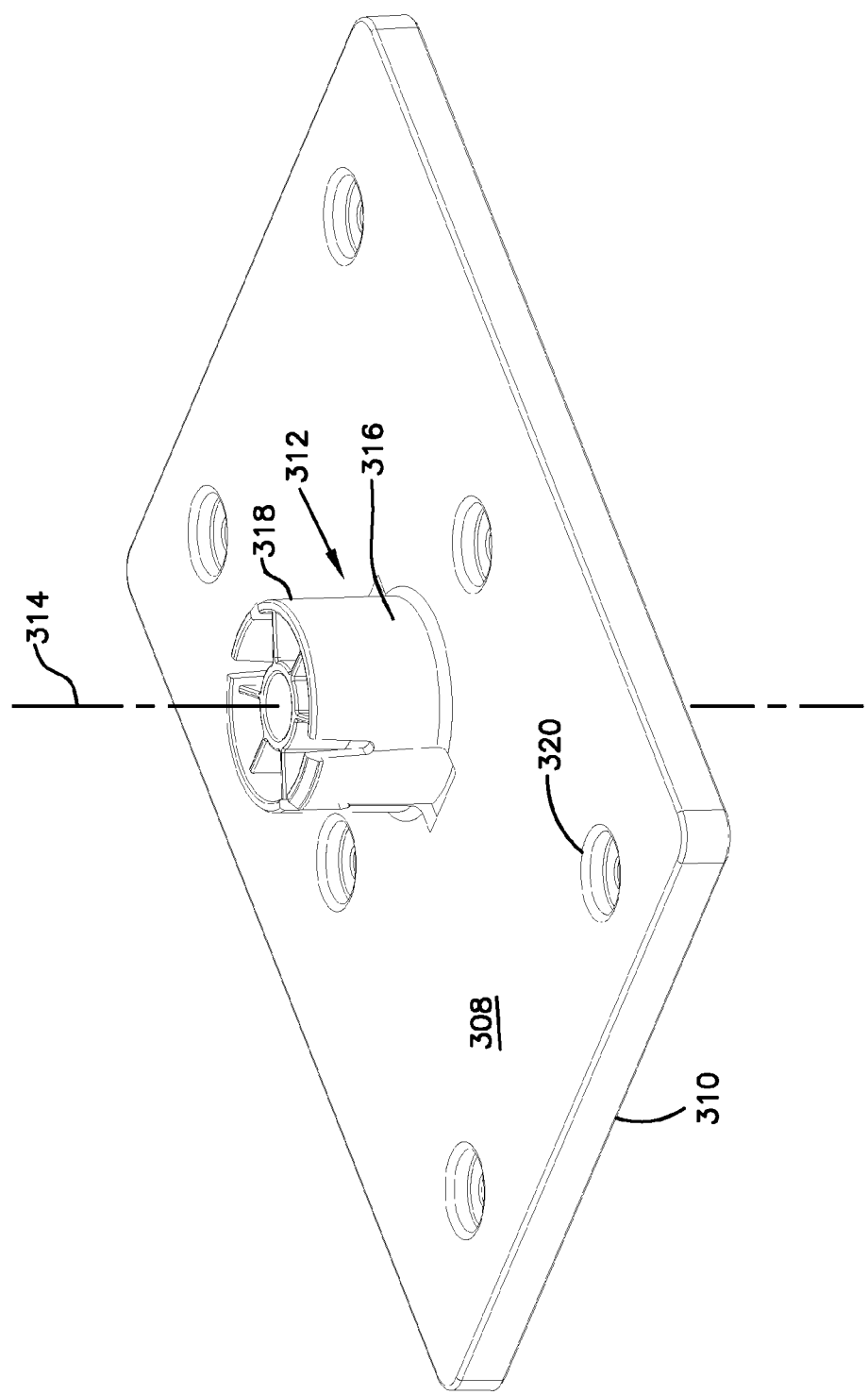
FIG. 24 is a perspective view of a mounting plate suitable for use with the cable spool mounting assembly of FIG. 23.

Referring now to FIGS. 23 and 24, the mounting plate 302 is generally plate shaped and includes a first surface 308 and an oppositely disposed second surface 310. The mounting plate 302 is adapted for stationary mounting to a mounting location (e.g., a wall, a pole, etc.). The first surface 308 is adapted to engage the cable spool assembly 304 while the second surface 310 is adapted to engage the mounting location.

The first surface 308 includes a spindle 312 that extends outwardly from the first surface 308. The spindle 312 is centrally disposed on the mounting plate 302 and is adapted to engage the cable spool assembly 304 so that the cable spool assembly 304 can rotate about a rotating axis 314. The spindle 312 includes a first axial end 316 and an oppositely disposed second axial end 318.

The first axial end 316 is engaged to the first surface 308. In the depicted embodiment of FIGS. 23 and 24, the first axial end 314 is integral with the first surface 308. In one aspect of the present disclosure, the first axial end 316 and the first surface 308 are monolithic.

The mounting plate 302 defines a plurality of thru-mounts 320. In the depicted embodiment of FIGS. 23 and 24, the mounting plate 302 defines six thru-mounts 320. The plurality of thru-mounts 320 extend through the first and second surfaces 308, 310 of the mounting plate 302. The plurality of thru-mounts 320 is adapted to receive fasteners (e.g., screws, bolts, etc.) for engagement with the mounting location.

Referring now to FIGS. 23 and 25-29, the cable spool assembly 304 includes an enclosure mount assembly 322 and a flange 324. The enclosure mount assembly 322 includes an enclosure mount 326 and a strain relief post 328.

The enclosure mount 326 includes a first face 330 and an opposite second face 332. The first face 330 includes a drum portion 334 that is centrally disposed on the first face 330. In the depicted embodiment, the drum portion 334 and the first face 330 are integral. The drum portion 334 extends outwardly from the first face 330 in a direction that is generally perpendicular to the first face 330.

The drum portion 334 includes an outer circumference 336, about which the cable 123 is coiled or wrapped. The drum portion 334 further includes a first end portion 338, which is in connected engagement with the first face 330 of the enclosure mount 326, and an oppositely disposed second end portion 340.

The drum portion 334 defines a central longitudinal bore 342, which extends longitudinally through the center of the drum portion 334. In the depicted embodiment of FIGS. 23 and 25-29, the central longitudinal bore 342 extends through the first and second end portions 338, 340 of the drum portion 334 and the first and second faces 330, 332.

The central longitudinal bore 342 defines an opening 344 at the second end portion 340 of the drum portion 334. The central longitudinal bore 342 is adapted to receive the spindle 312 of the mounting plate 302 through the opening 344 in the second end portion 340. In one aspect of the present disclosure, an inner diameter of the central longitudinal bore 342 is slightly larger than an outer diameter of the spindle 312 so that the enclosure mount 326 can rotate about the rotating axis 314.

The second face 332 is adapted for engagement with the main body 16. The second face 332 defines a central recess 350. The central recess 350 is adapted to receive a strain relief insert 352.

The second face 332 further defines a cable guide 354. The cable guide 354 provides a cable pathway to the main body 16 of the housing 12. In one aspect of the present disclosure, the cable guide 354 is adapted to route cable from the strain relief insert 352 to the central entry opening 122 of the main body 16.

The cable guide 354 is a recessed groove that generally extends from the central recess 350 to an outer periphery portion 356 of the enclosure mount 326. In the depicted embodiment of FIGS. 25, 27 and 28, the cable guide 354 extends through a side wall 358 of the enclosure mount 326. The cable guide 354 is positioned so that a portion of the cable guide 354 is aligned with the cable entry opening 122 of the main body 16.

The enclosure mount 326 includes a plurality of retention tabs 360 that extends outwardly from sidewalls 362 of the cable guide 354. The retention tabs 360 are adapted to retain the cable 123 in the cable guide 354.

The enclosure mount 326 includes a first side projection 364a and an oppositely disposed second side projection 364b. The first and second side projections 364a, 364b extend outwardly from the second face 332. In the depicted embodiment of FIGS. 25-29, the first and second side projections 364a, 364b extend outwardly from the second face 332 in a direction that is generally perpendicular to the second face 332. The first side projection 364a includes a first retention edge 366a that extends outwardly from the first side projection 364a. The second side projection 364b includes a second retention edge 366b that extends outwardly from the second side projection 364b.

The second face 332, the first side projection 364a and the first retention edge 366a cooperatively define a first retention channel 368 while the second face 332, the second side projection 364b and the second retention edge 366b cooperatively define a second retention channel. The first and second retention channels 368 are adapted to receive the base wall 58 of the main body 16 and retain the base wall 58 of the main body 16 in engagement with the enclosure mount 326. Each of the first and second retention channels 368 includes a first end 370a and an oppositely disposed second end 370b.

The second face 332 further includes a plurality of resilient latches 372. Each of the resilient latches 372 includes a free end portion 374 that extends outwardly from the second face 332. The free end portions 374 of the resilient latches 372 are adapted to engage the base wall 58 of the main body 16.

To engage the main body 16 and the enclosure mount 326, outer periphery portions of the base wall 58 are inserted into the first ends 370a of the first and second retention channels 366a, 366b. The main body 16 is then pushed toward the enclosure mount 326 so that the outer periphery portions of the main body 16 are disposed in the first and second retention channels 368. When the main body 16 is aligned with the enclosure mount 326, the resilient latches 372 engage the base wall 58 of the main body 16.

The enclosure mount 326 defines a cable opening 375 that extends through the first and second faces 330, 332. The cable opening 375 is offset from the drum portion 334. The cable opening 375 is adapted to provide a path through which the cable 123 can pass from the drum portion 334 through the enclosure mount 326 to the second face 332 of the enclosure mount 332.

Figure 25:
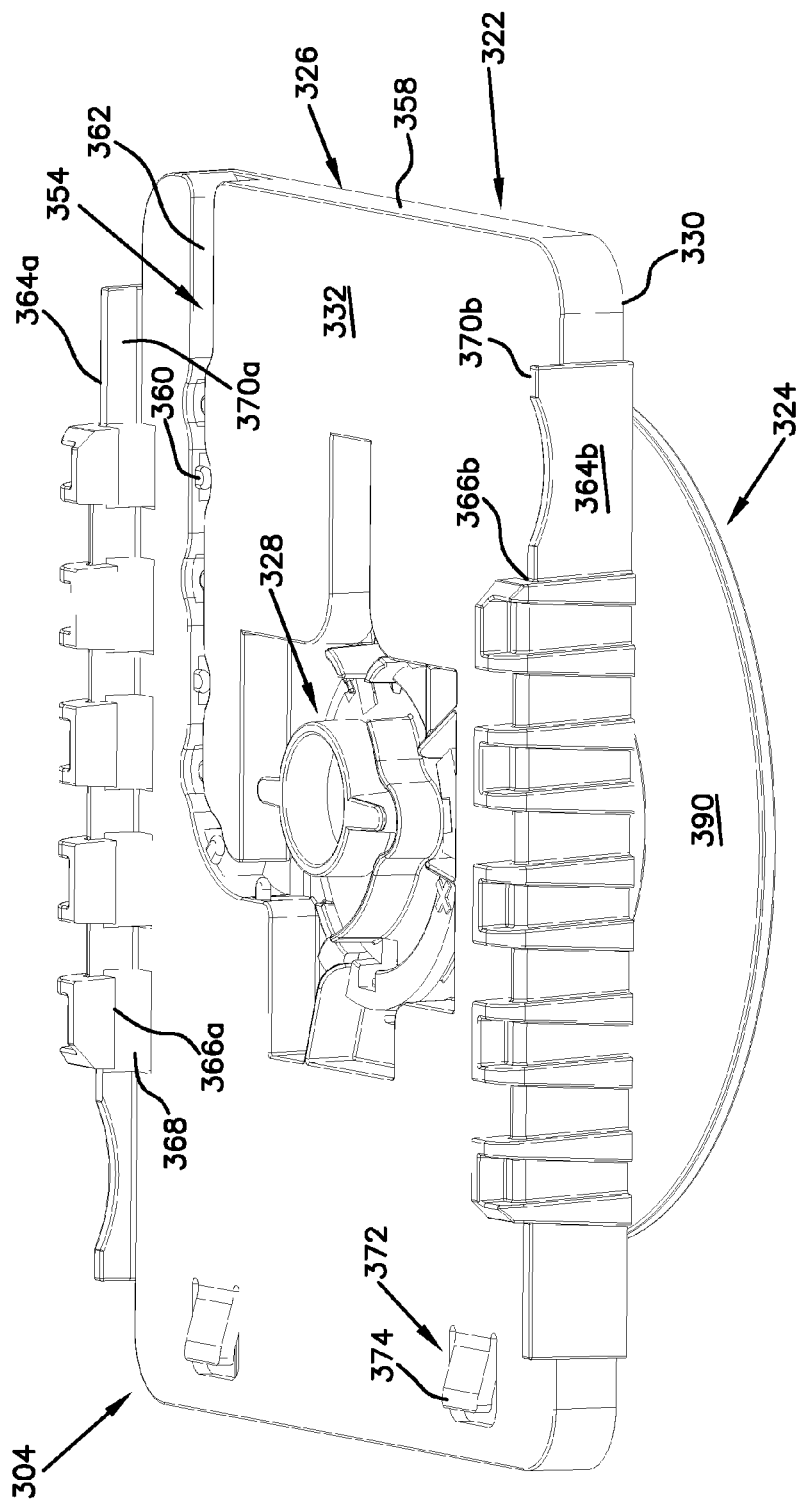
FIG. 25 is a perspective view of a cable spool assembly suitable for use with the cable spool mounting assembly of FIG. 23.
Figure 27:
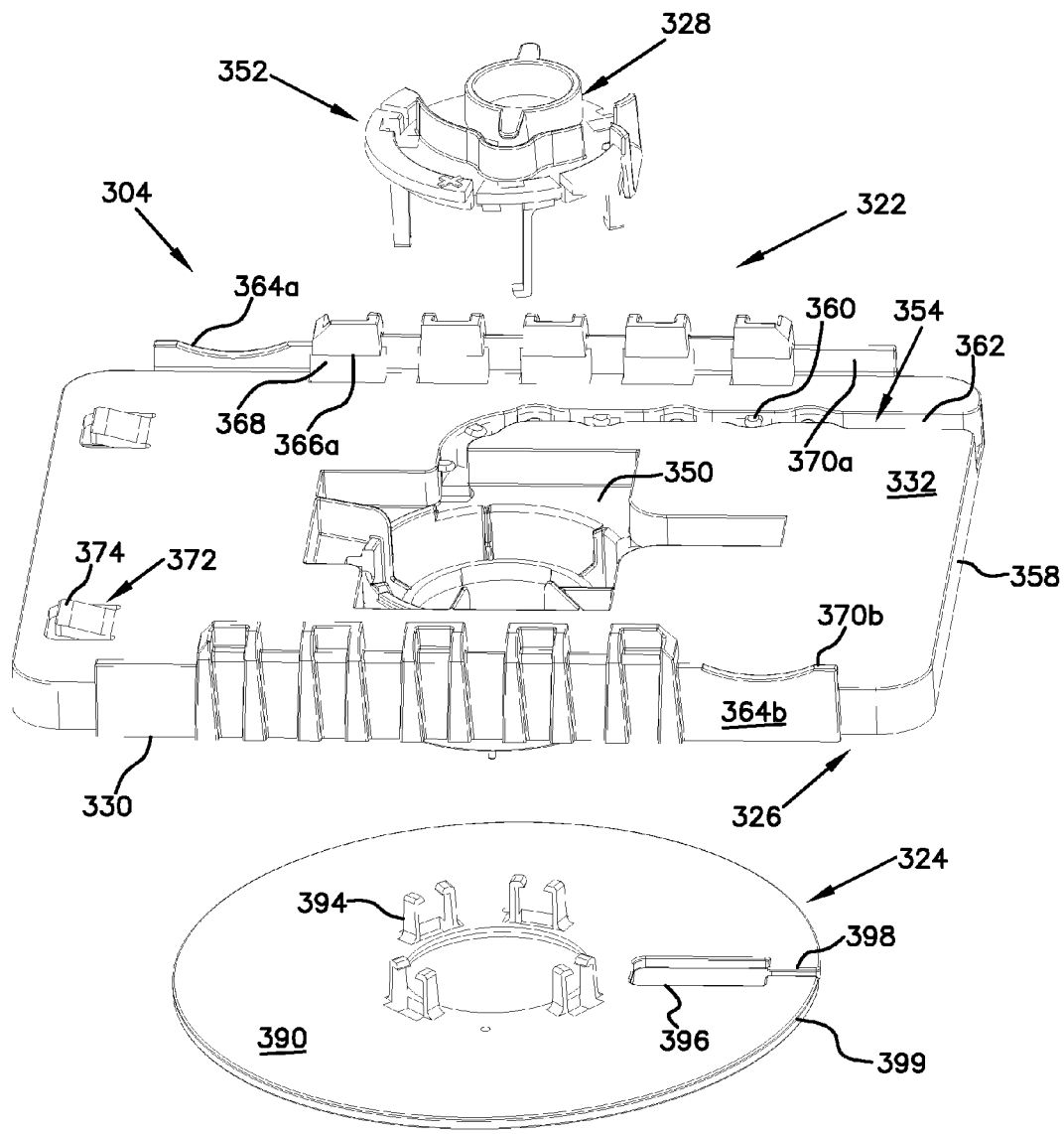
FIG. 27 is an exploded perspective view of the cable spool assembly of FIG. 25.
Figure 28:
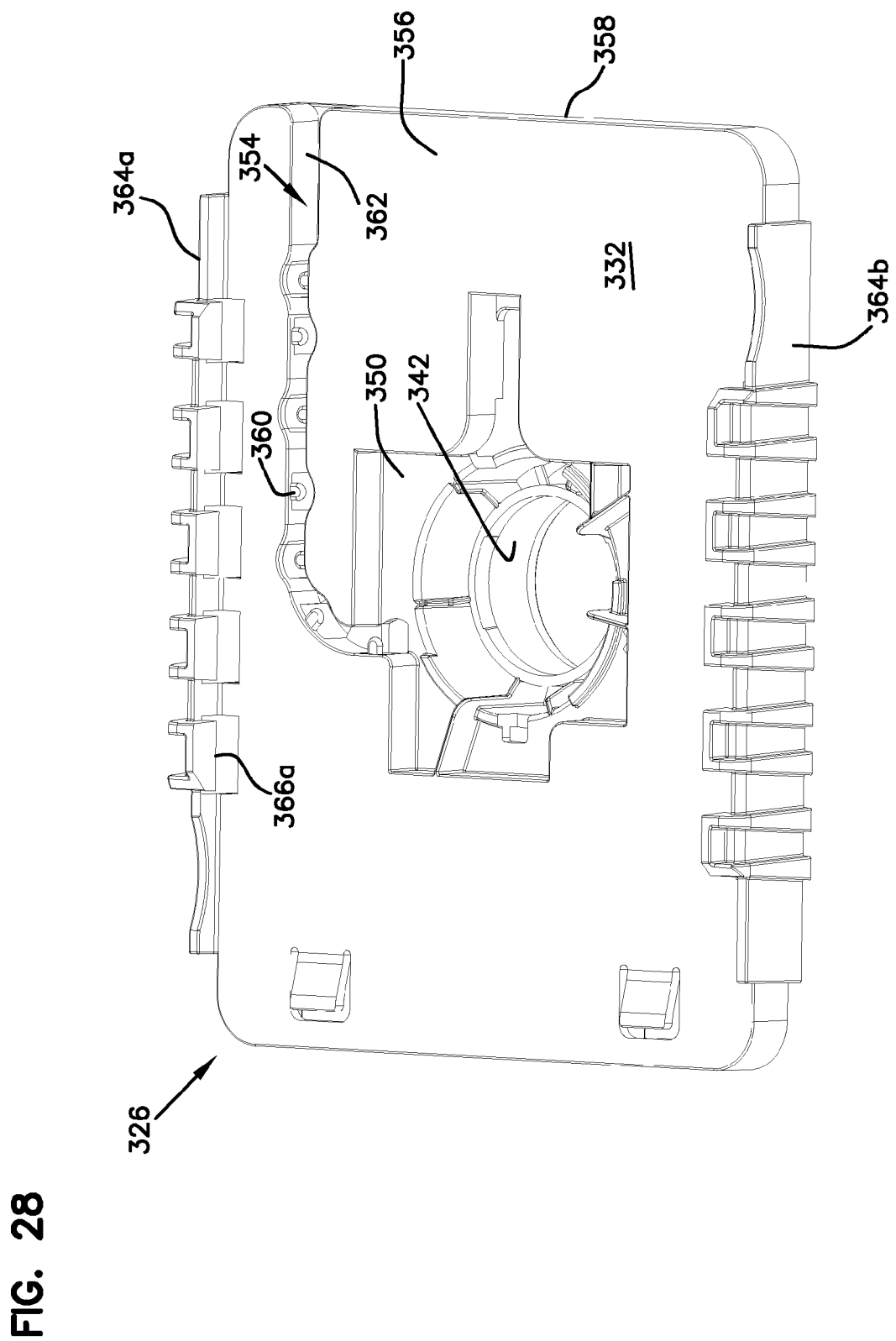
FIG. 28 is a perspective view of an enclosure mount of the cable spool assembly of FIG. 25.
Figure 29:
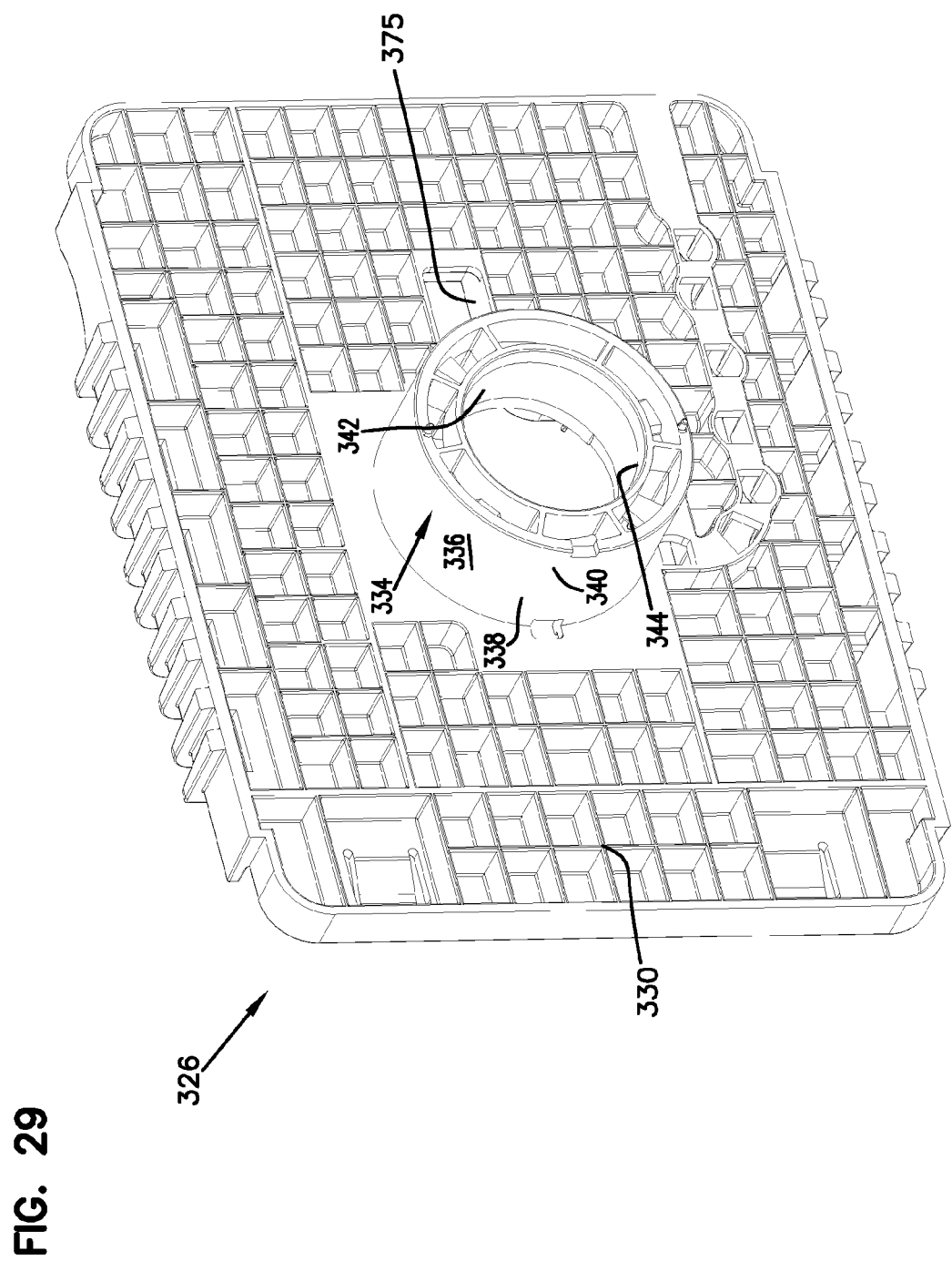
FIG. 29 is a perspective view of an enclosure mount of the cable spool assembly of FIG. 25.
Figure 30:
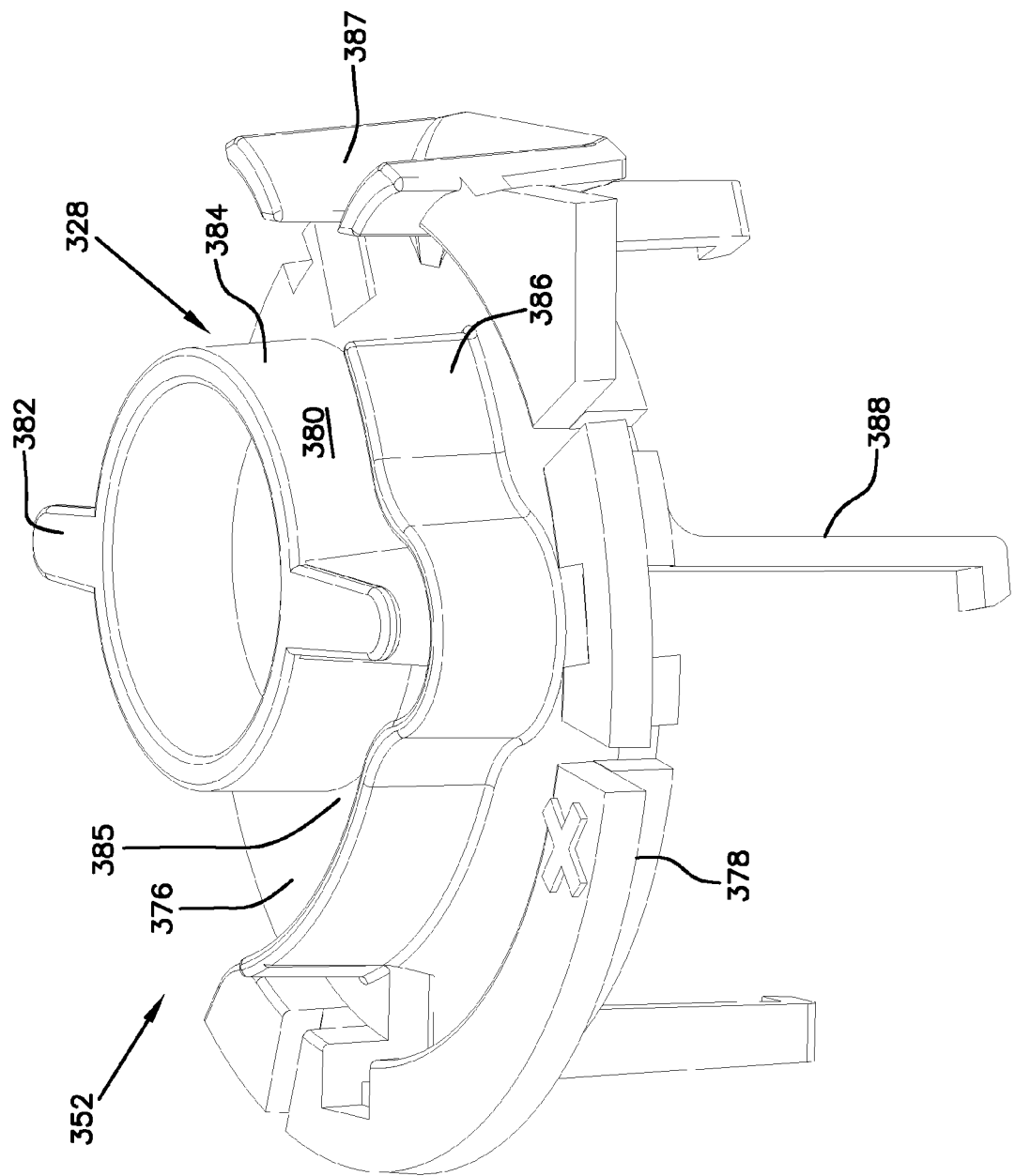
FIG. 30 is a perspective view of a strain relief insert suitable for use with the cable spool assembly of FIG. 25.

Referring now to FIGS. 25, 27 and 30, the strain relief insert 352 is shown. The strain relief insert 352 is adapted for engagement with the enclosure mount 326. In the depicted embodiment of FIGS. 25 and 27, the strain relief insert 352 is disposed in the cable recess 350 so that the strain relief insert 352 does not interfere with the main body 16 when the main body 16 is engaged with the cable spool mounting assembly 300.

The strain relief insert 352 includes a first surface 376 and an oppositely disposed second surface 378. The first surface 376 of the strain relief insert 352 includes the strain relief post 328. The strain relief post 328 is a generally cylindrical shaped protrusion that extends outwardly from the first surface 376 of the strain relief insert 352.

The strain relief post 328 includes an outer surface 380 about which the cable 123 is wrapped. In the subject embodiment, the cable 123 is wrapped about the strain relief post 328 at least once. The strain relief post 328 further includes a plurality of retention projections 382 that extends outwardly from the outer surface 380 at an end 384 of the strain relief post 378.

The first surface 376 of the strain relief insert 352 includes a cable path 385. The cable path 385 is adapted to route the cable 123 from the cable opening 375 defined by the enclosure mount 326, around the strain relief post 328 and to the cable guide 354. The cable path 385 is defined by a cable guide wall 386 that extends outwardly from the first surface 376 of the strain relief insert 352. The cable guide wall 386 includes a plurality of bend radius protectors 387 at a cable entrance location, which is disposed adjacent to the cable opening 375 in the enclosure mount 326, to the cable path 385.

The second surface 378 of the strain relief insert 352 includes a plurality of resilient latches 388 that extend outwardly from the second surface 378. Each of the resilient latches 388 extends in a direction that is generally perpendicular to the second surface 378.

The resilient latches 388 are adapted for engagement with the drum portion 334 of the enclosure mount 326. In the subject embodiment, the resilient latches 388 are adapted for snap-fit engagement with the enclosure mount 326.

Figure 26:
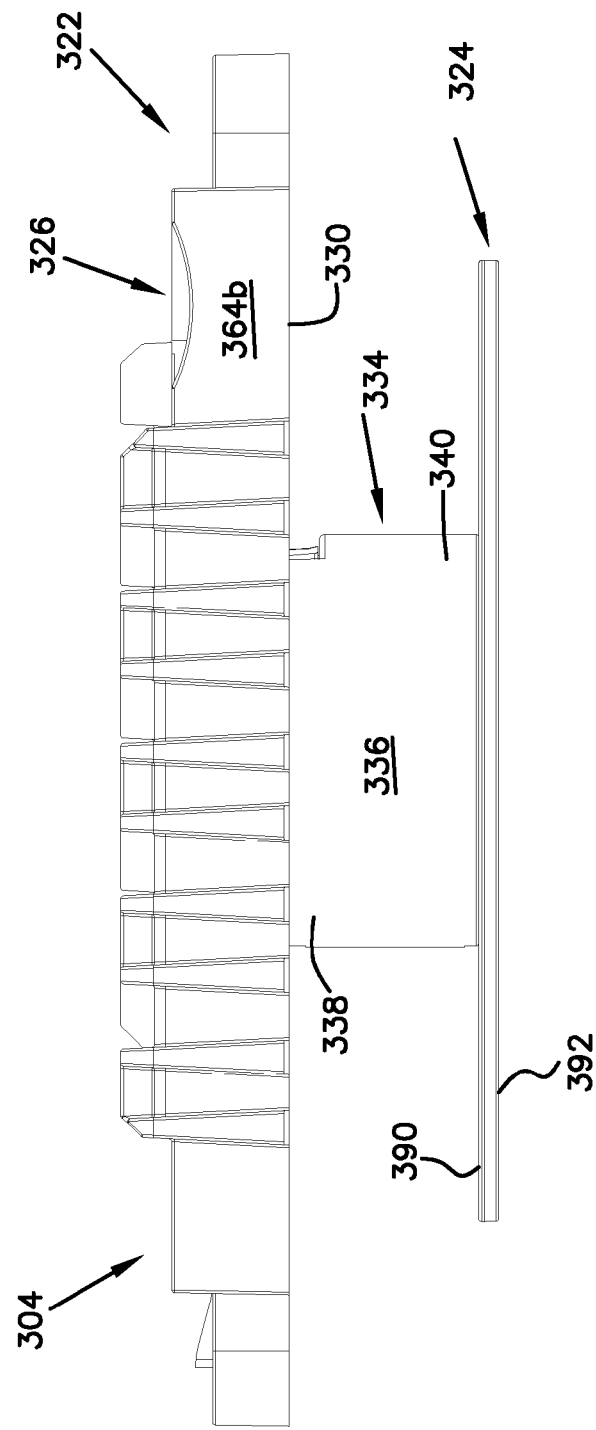
FIG. 26 is a side view of the cable spool assembly of FIG. 25.

Referring now to FIGS. 25-27, the flange 324 is shown. The flange 324 is generally circular in shape and includes a first surface 390 and an oppositely disposed second surface 392. The first surface 390 includes a plurality of latches 394 that extend outwardly from the first surface 390. In the subject embodiment, the first surface 390 includes four latches 394. In the depicted embodiment, the plurality of latches 394 extend outwardly from the first surface 390 in a direction that is generally perpendicular to the first surface 390. The plurality of latches 394 is adapted to engage the drum portion 334 of the enclosure mount 326 so that the flange 324 is disposed at the second end portion 340 of the drum portion 334.

The flange 324 defines an opening 396 that extends through the first and second surfaces 390, 392 of the flange 324. The flange 324 further defines a slot 398 that extends from an outer edge 399 of the flange 324 to the opening 396.

Figure 19:
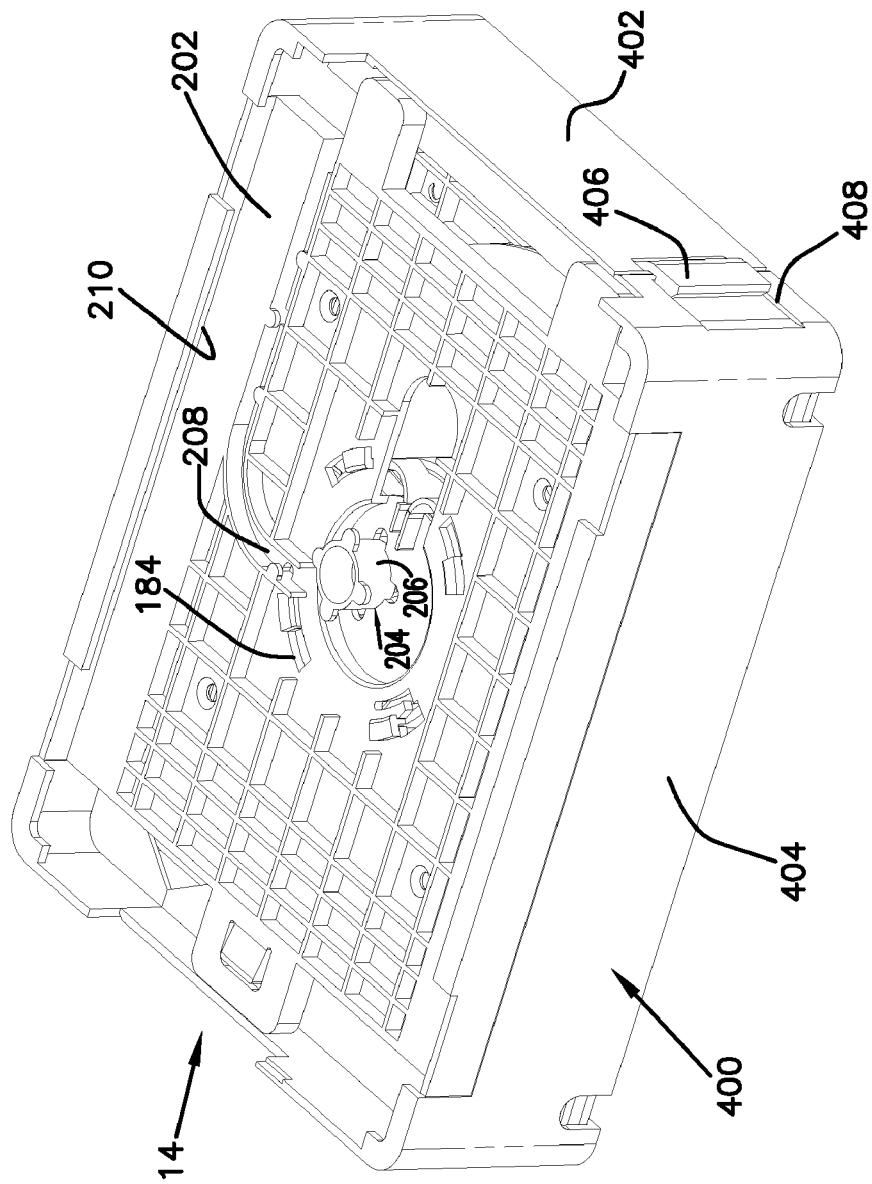
FIG. 19 is a perspective view of a cable spool mounting assembly suitable for use with the fiber optic enclosure of FIG. 1.
Figure 20:
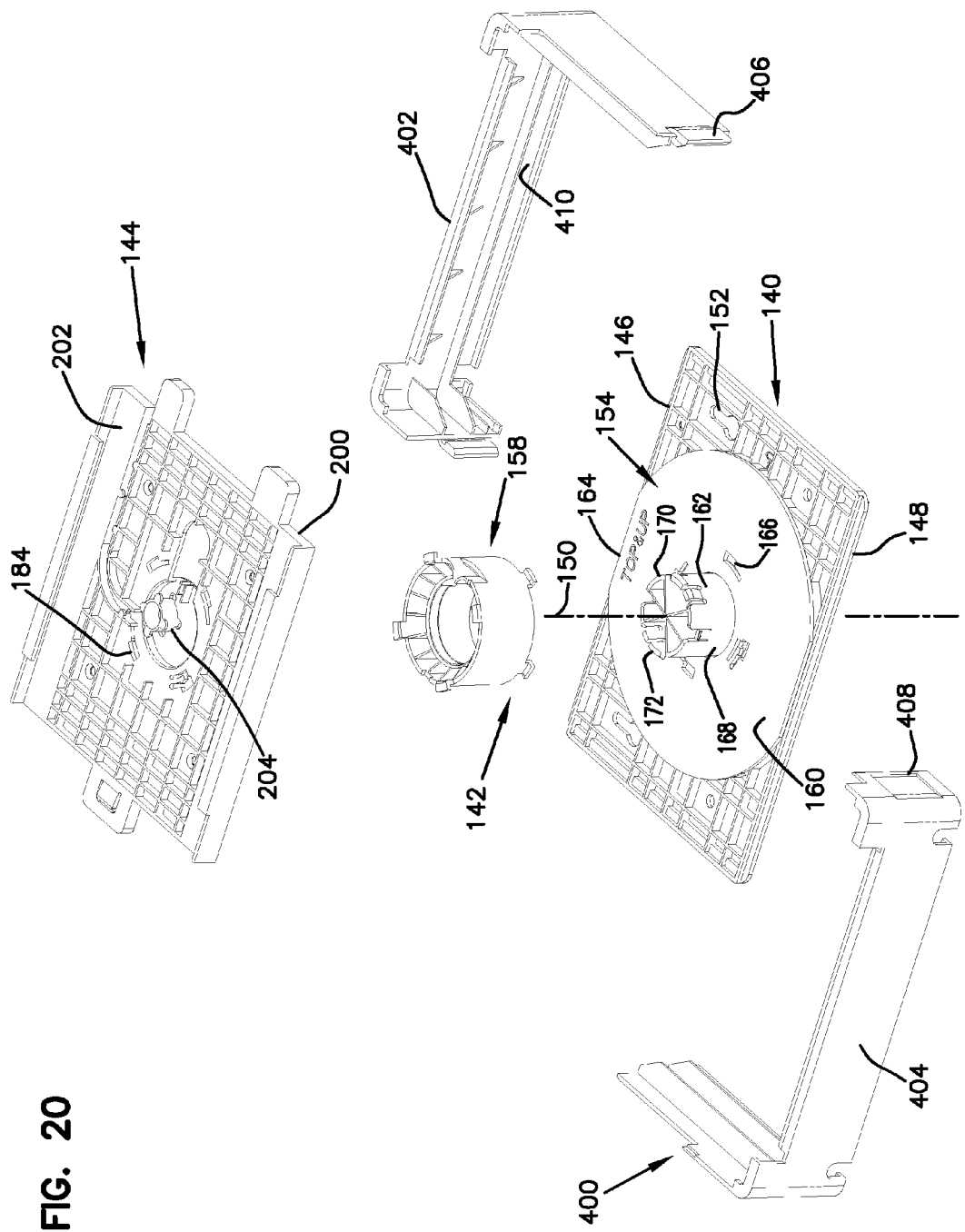
FIG. 20 is an exploded perspective view of the cable spool mounting assembly of FIG. 19.
Figure 21:
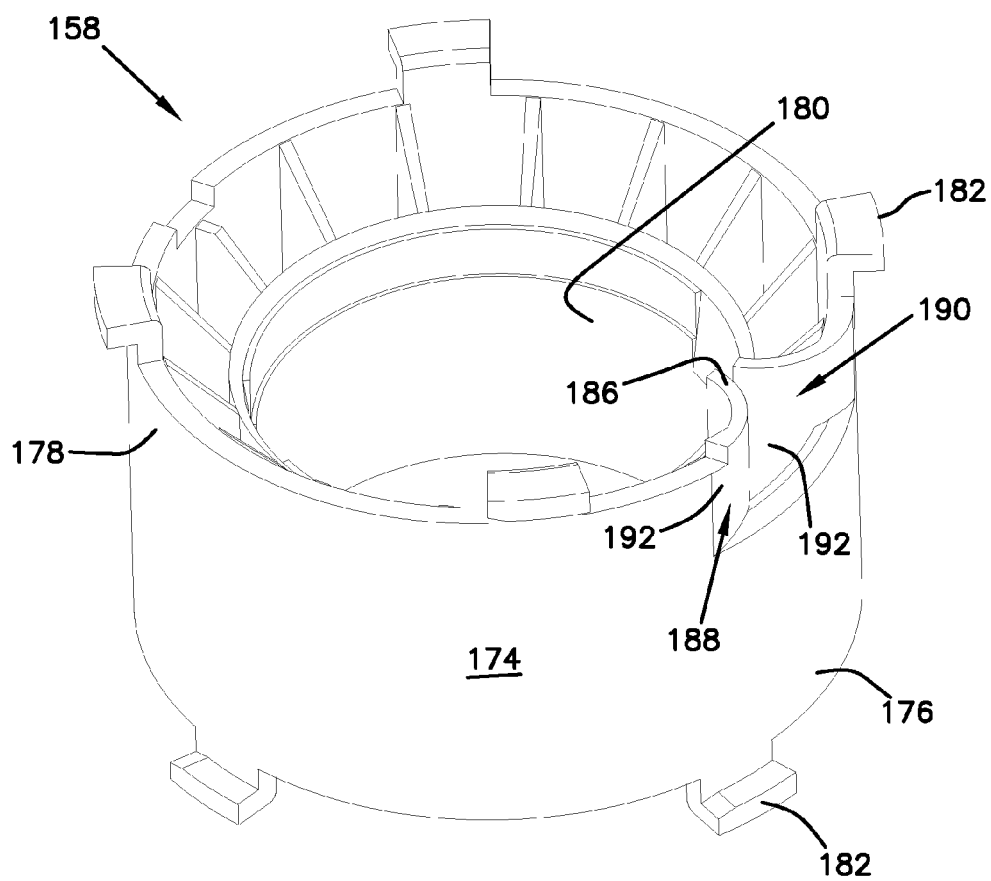
FIG. 21 is a perspective view of a drum portion of the cable spool mounting assembly of FIG. 19.
Figure 22:
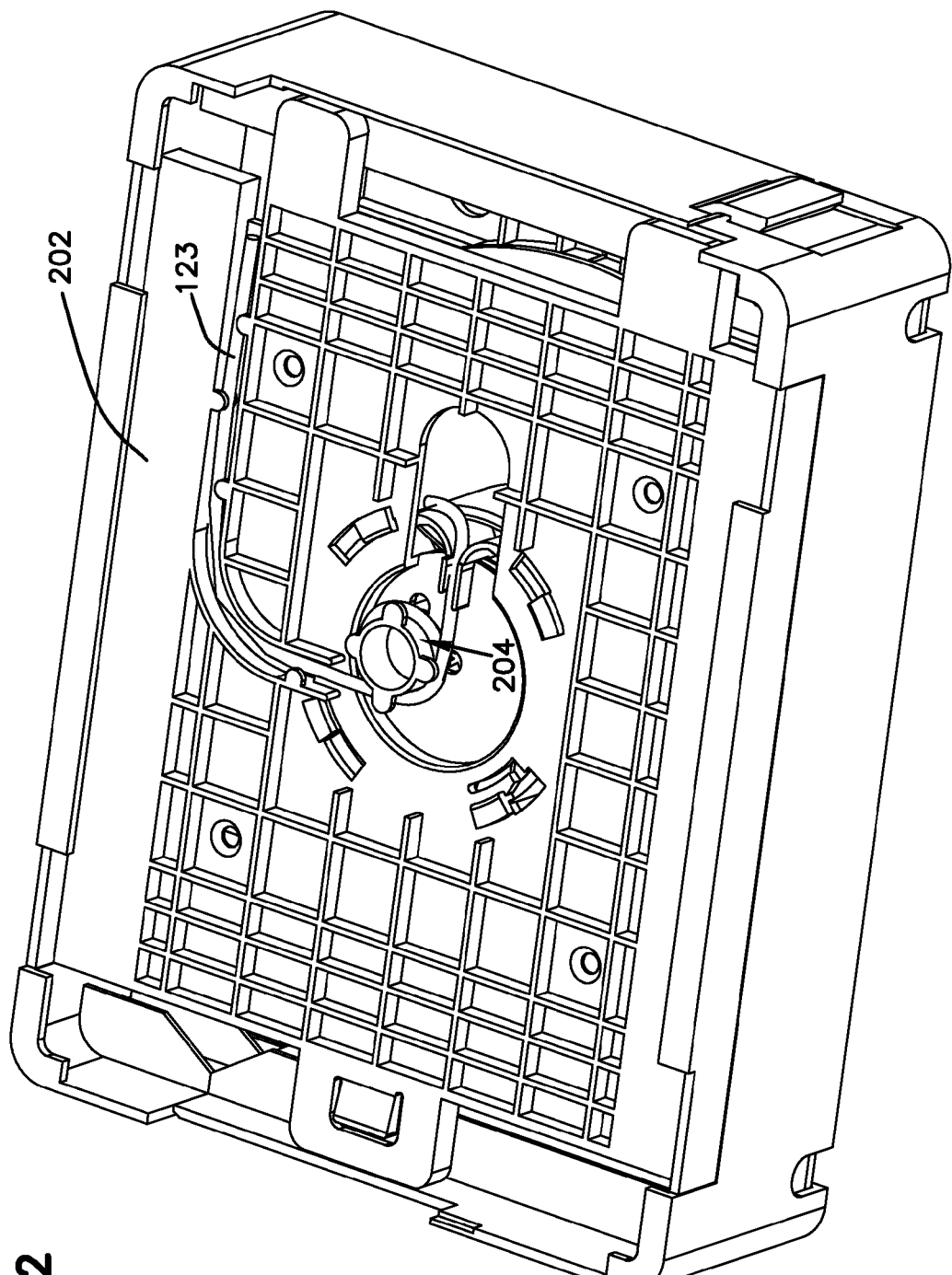
FIG. 22 is a schematic representation of a cable routing scheme.

Referring now to FIGS. 19 and 20, a shroud 400 is shown. The shroud 400 is adapted to retain the position of the cable spool assembly 142, 304 relative to the housing 12. The shroud 400 includes a first member 402 and a second member 404. The first and second members 402, 404 of the shroud 400 are adapted to engage the sides of the mounting plate 140, 302 and to engage the main body 16 of the housing 12.

The first member 402 includes a plurality of resilient latches 406 while the second member 404 includes a plurality of notches 408. The resilient latches 406 are adapted for snap-fit engagement with the plurality of notches 408.

Each of the first and second members 402, 404 of the shroud 400 defines a channel 410 that is adapted to receive an outer edge of the mounting plate 140. The first and second members 402, 404 of the shroud 400 have a height that is greater than the height of the drum portion 158 of the cable spool assembly 142 so that the main body 16 can be prevented from rotating relative to the mounting plate 140 when the shroud 400 is engaged.

Figure 31:
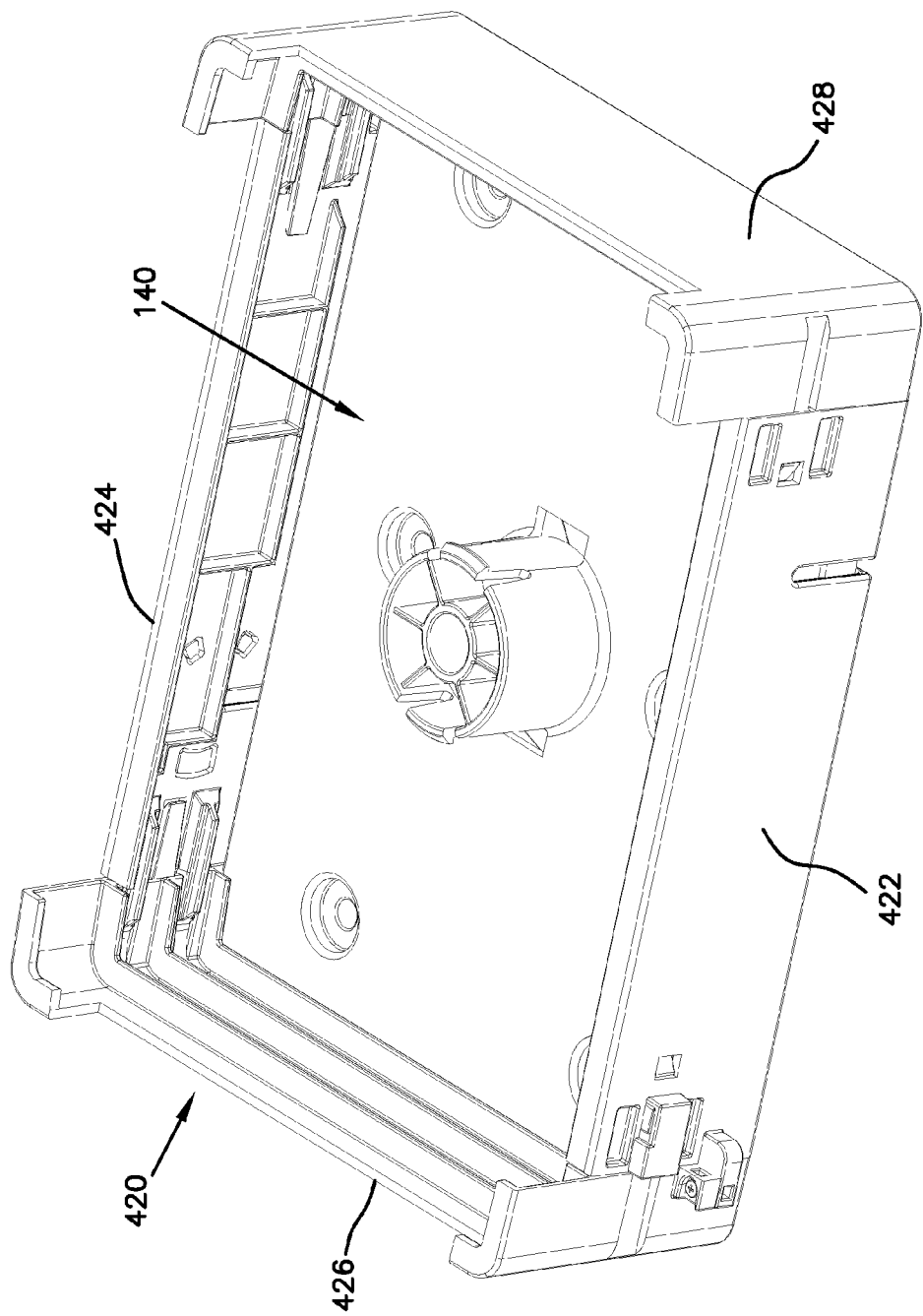
FIG. 31 is an alternate embodiment of a shroud suitable for use with the fiber optic enclosure of FIG. 1.
Figure 32:
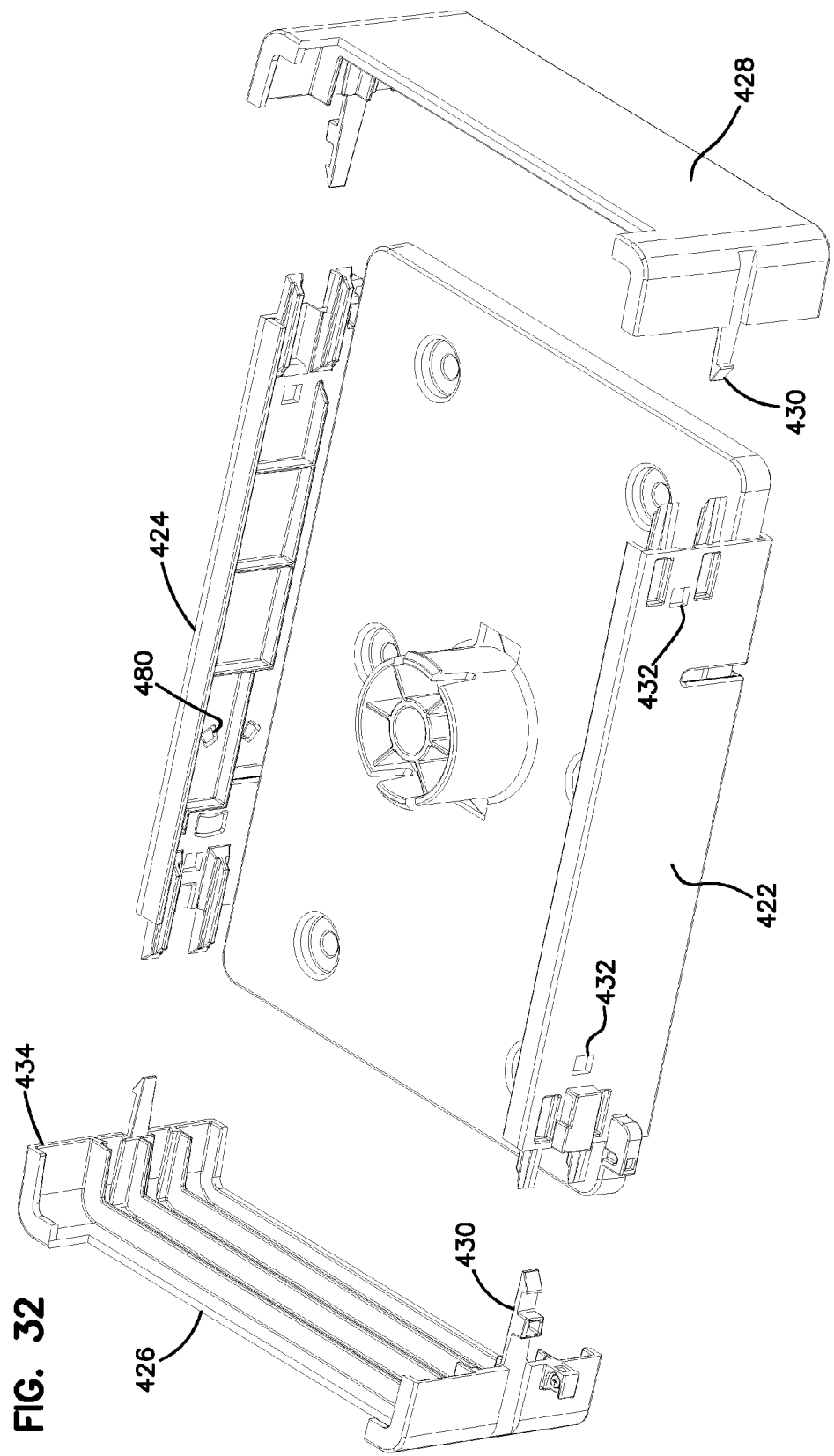
FIG. 32 is an exploded perspective view of the shroud of FIG. 31.
Figure 33:
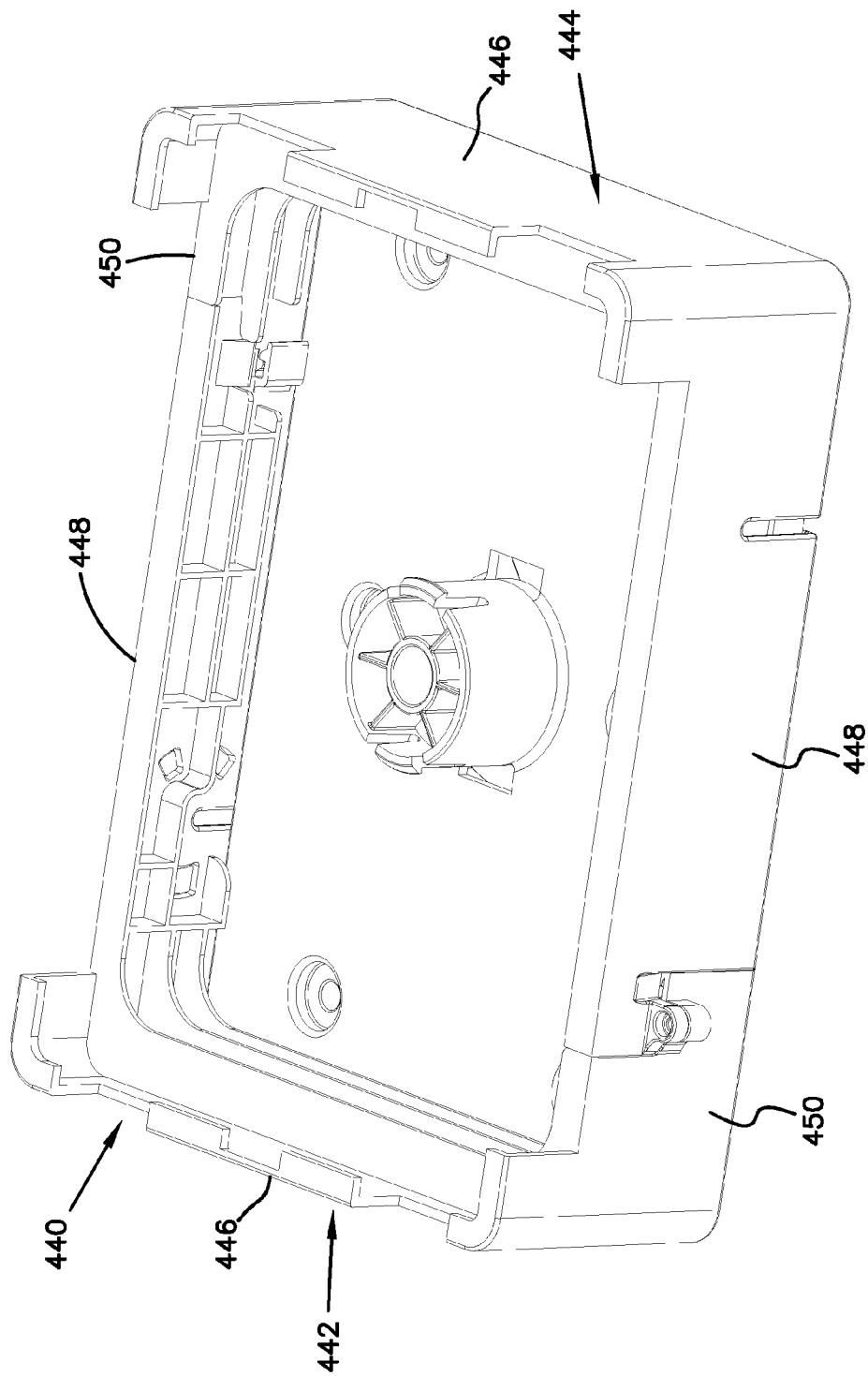
FIG. 33 is a perspective view of an alternate embodiment of a shroud suitable for use with the fiber optic enclosure of FIG. 1.
Figure 34:
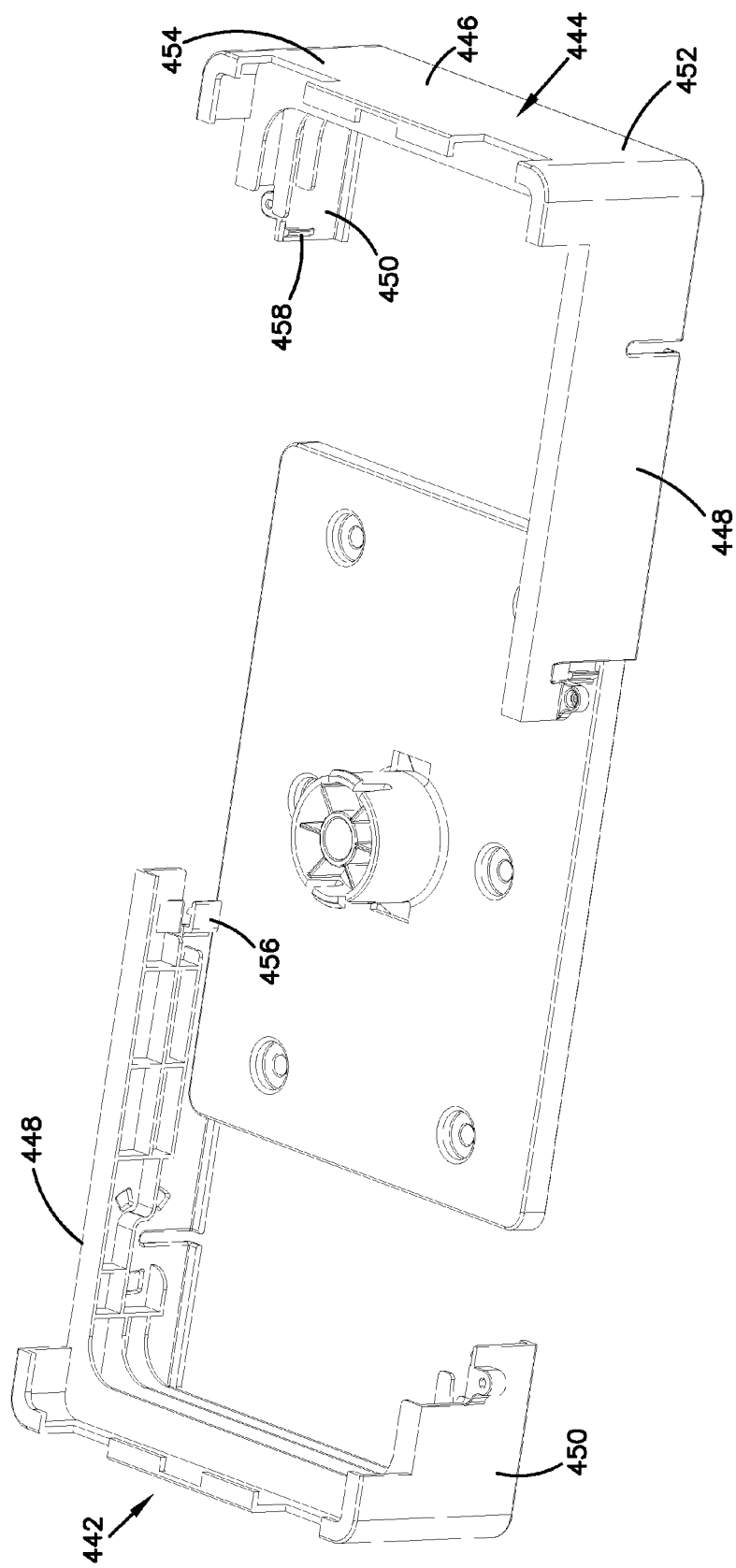
FIG. 34 is an exploded perspective view of the shroud of FIG. 33.
Figure 35:
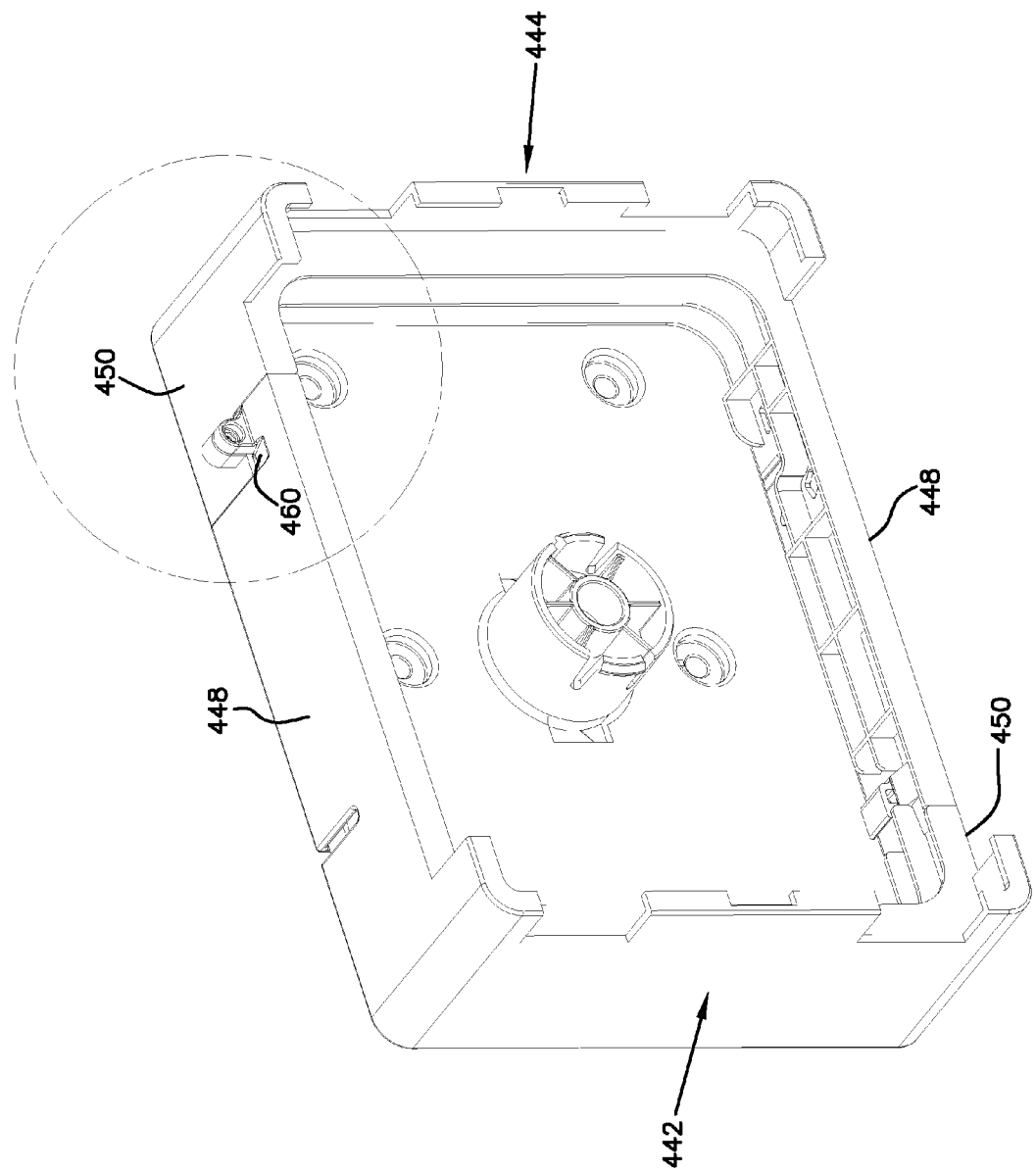
FIG. 35 is a perspective view of the shroud of FIG. 33.
Figure 36:
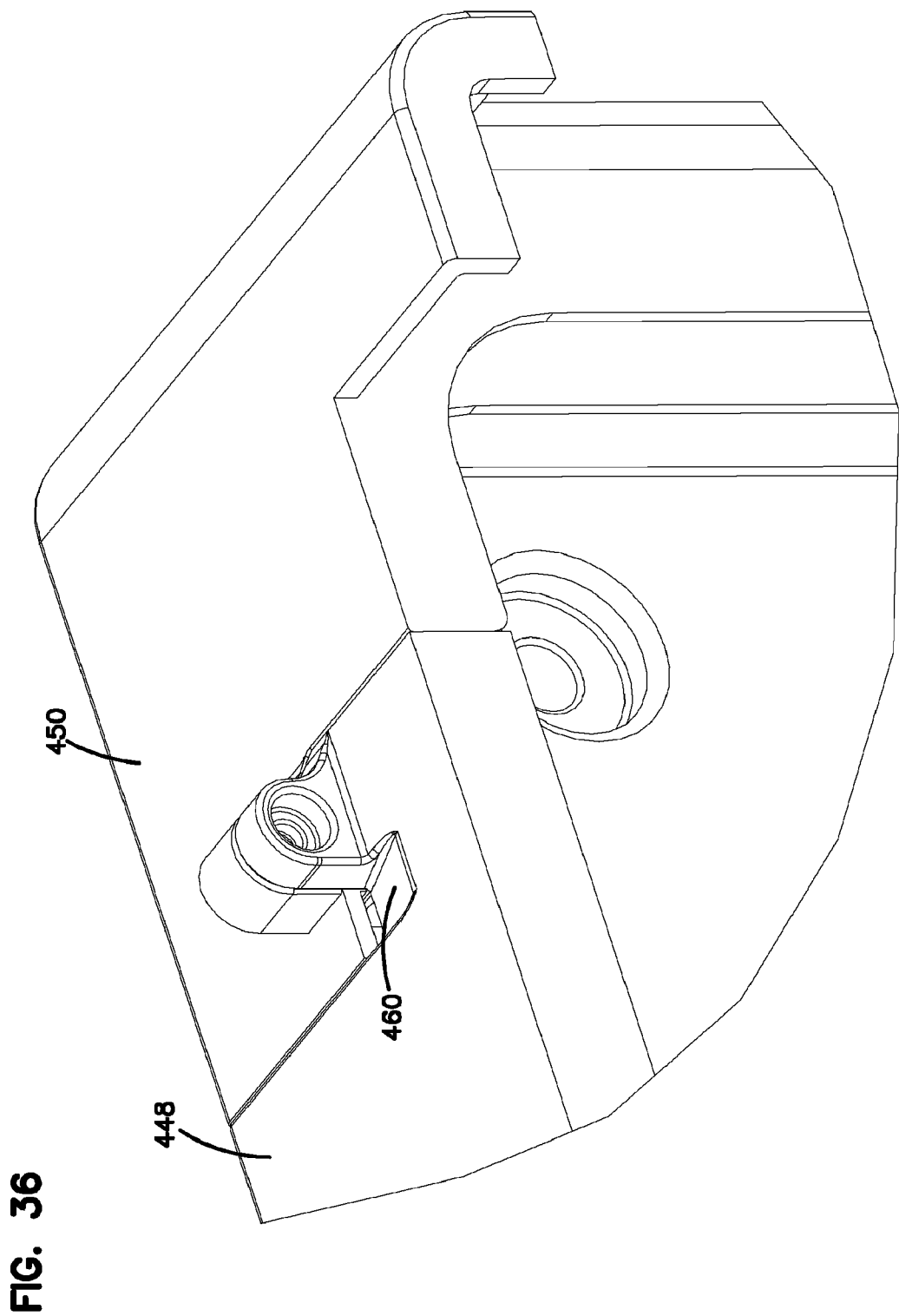
FIG. 36 is an enlarged fragmentary view of the shroud of FIG. 35.

Referring now to FIGS. 31 and 32, an alternate embodiment of a shroud 420 is shown. The shroud 420 include a first side member 422, an opposite second side member 424, a third side member 426 and an opposite fourth side member 428. In the depicted embodiment of FIGS. 34 and 35, the first and second side members 422, 424 are adapted to engage the longitudinal sides of the mounting plate 140 and the main body 16 while the third and fourth side members 426, 428 are adapted to engage the sides of the mounting plate 140 and the main body 16 that are adjacent to the longitudinal sides.

In the depicted embodiment the first and second side members 422, 424 are adapted for snap-fit engagement with the third and fourth side members 426, 428. The third and fourth side members 426, 428 include latches 430 that are adapted to engage notches 432 defined by the first and second side members 422, 424.

The third and fourth side members 426, 428 further include corner projections 434. The corner projections 434 are adapted to engage a portion of the corners of the enclosure mount 326.

Referring now to FIGS. 33-36, an alternate embodiment of a shroud 440 is shown. The shroud 440 includes a first side member 442 and an oppositely disposed second side member 444. The first and second side members 442, 444 are generally U-shaped. Each of the first and second side members 442, 444 includes a main wall 446, a first wall 448 and a second wall 450. The main wall 446 includes a first end 452 and an oppositely disposed second end 454. The first wall 448 extends outwardly from the main wall 446 at the first end 452 while the second wall 450 extends outwardly from the main wall 446 at the second end 454. In the depicted embodiment, the first wall 448 is longer than the second wall 450.

Each of the first walls 448 of the first and second side members 442, 444 includes a resilient latch 456. The resilient latch 456 of the first wall 448 of the first side member 442 is adapted for engagement with a notch 458 defined by the second wall 450 of the second side member 444 while the resilient latch 456 of the first wall 448 of the second side member 444 is adapted for engagement with the notch 458 defined by the second wall 450 of the first side member 442.

The first wall 448 defines a release groove 460 that is adjacent to the resilient latch 456. The release groove 460 provides a location at which a tool can be inserted to separate the first and second side members 442, 444.

Figure 37:
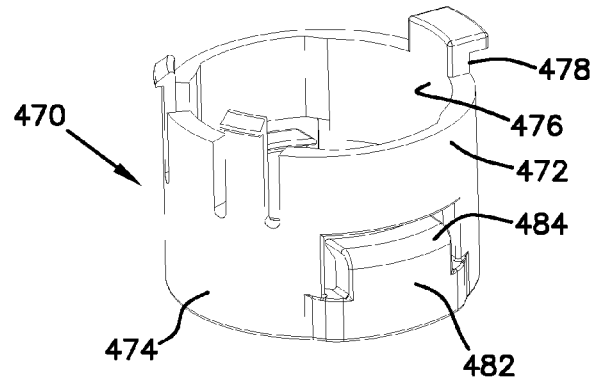
FIG. 37 is a perspective view of an adapter suitable for use with the fiber optic enclosure of FIG. 1.
Figure 38:
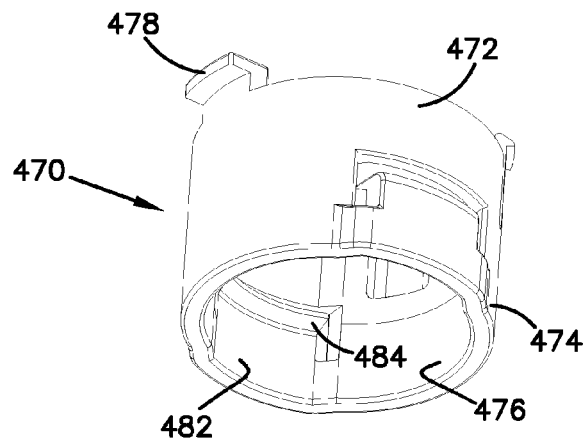
FIG. 38 is a perspective view of the adapter of FIG. 37.
Figure 39:
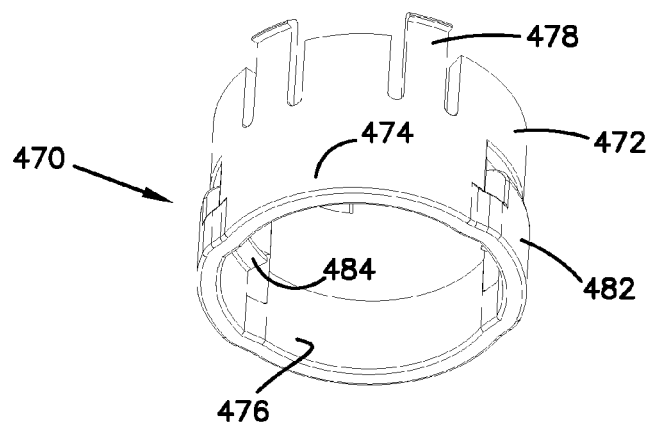
FIG. 39 is a perspective view of the adapter of FIG. 37.
Figure 40:
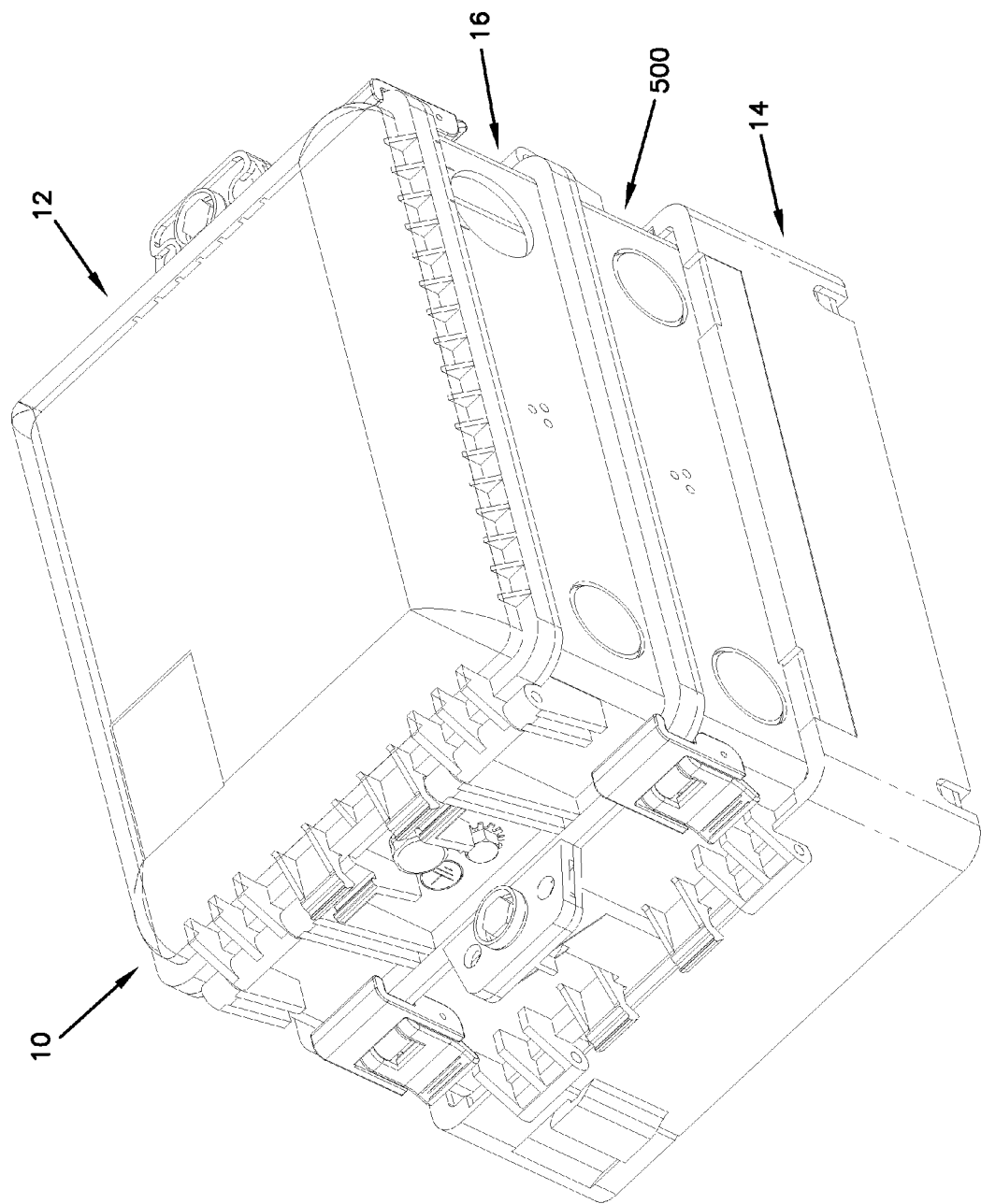
FIG. 40 is a perspective view of a modular fiber optic enclosure.
Figure 41:
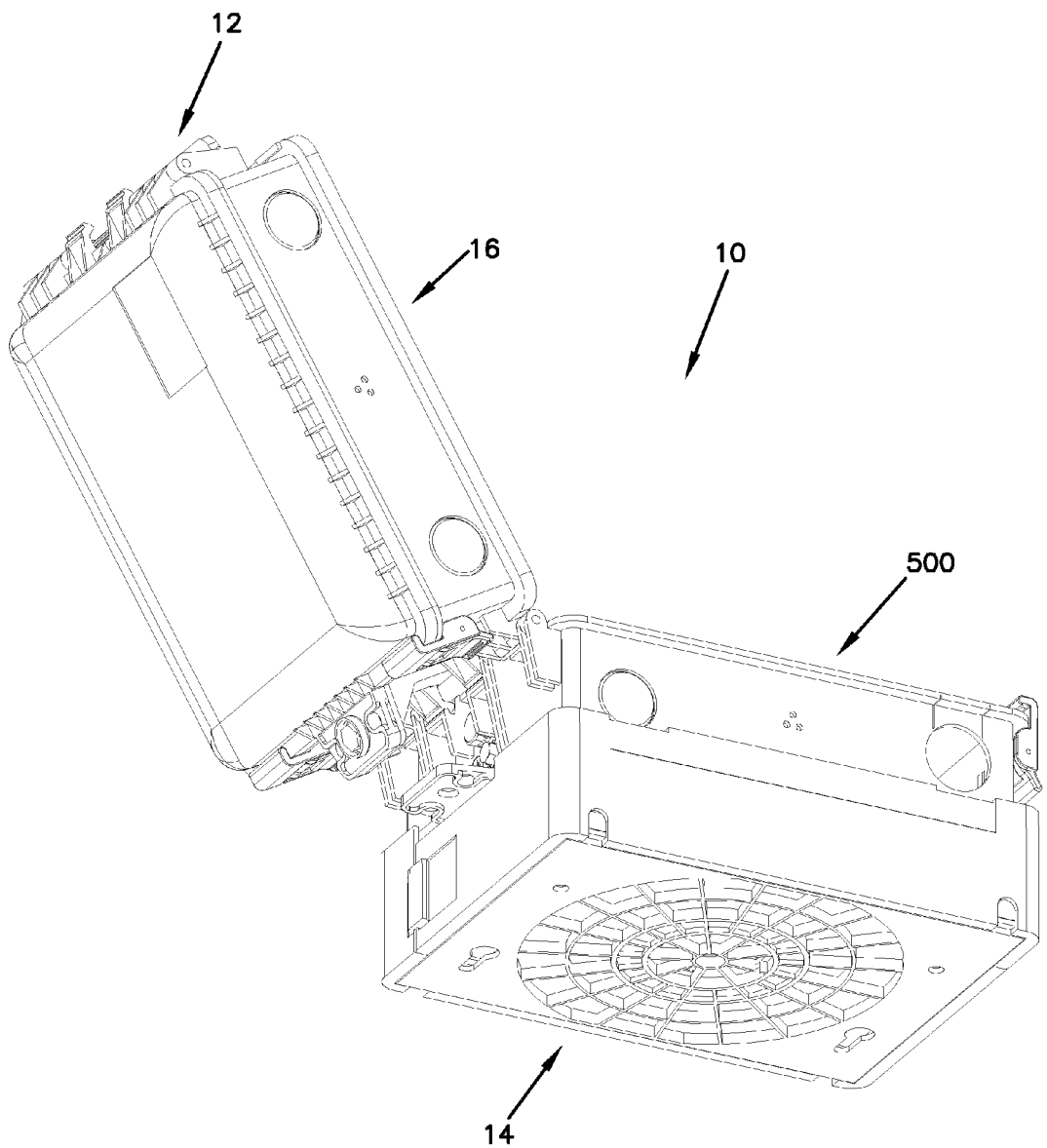
FIGS. 41-43 are perspective views of the modular fiber optic enclosure of FIG. 40 with the main body in an open position.
Figure 42:
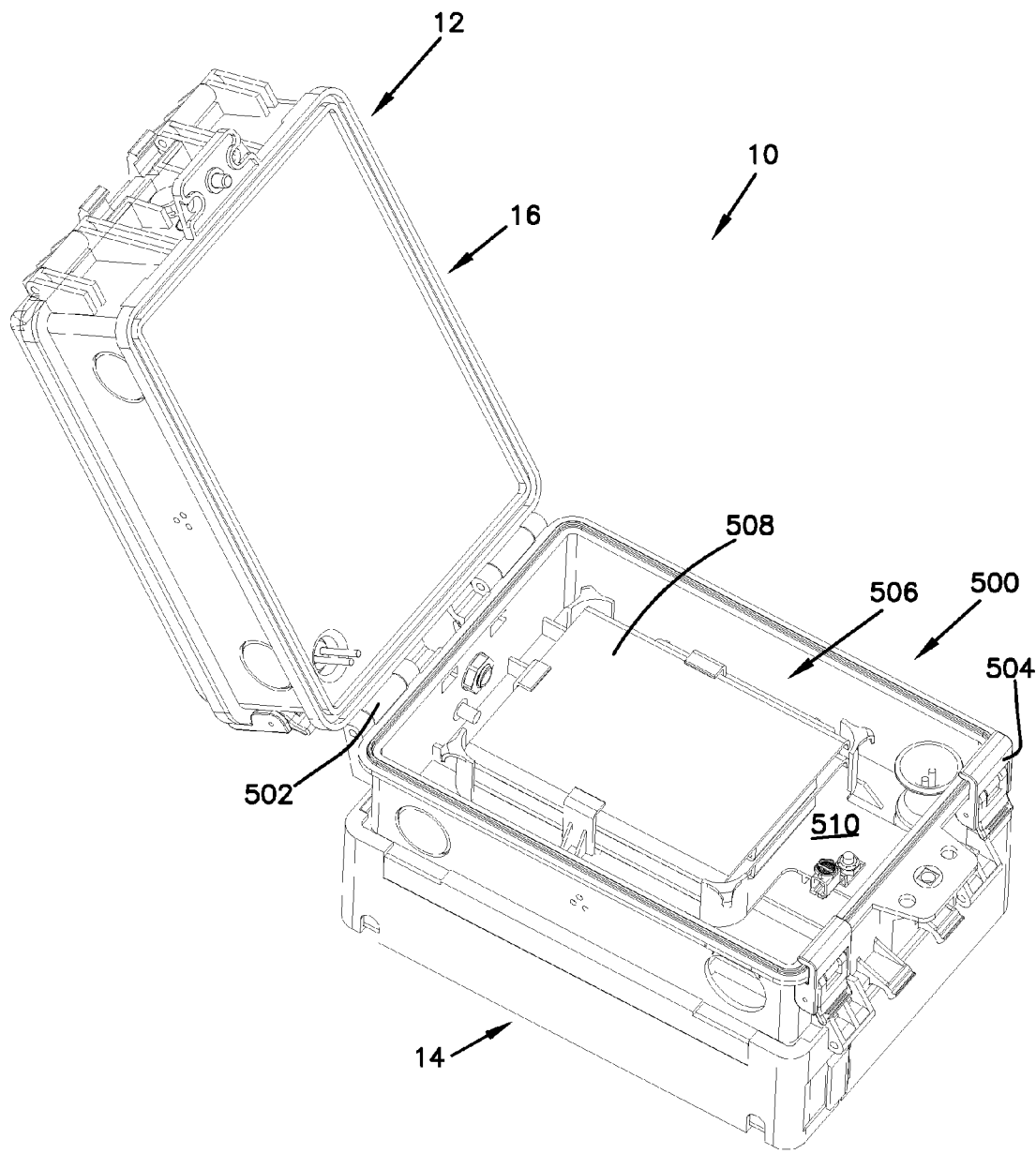
Figure 43:
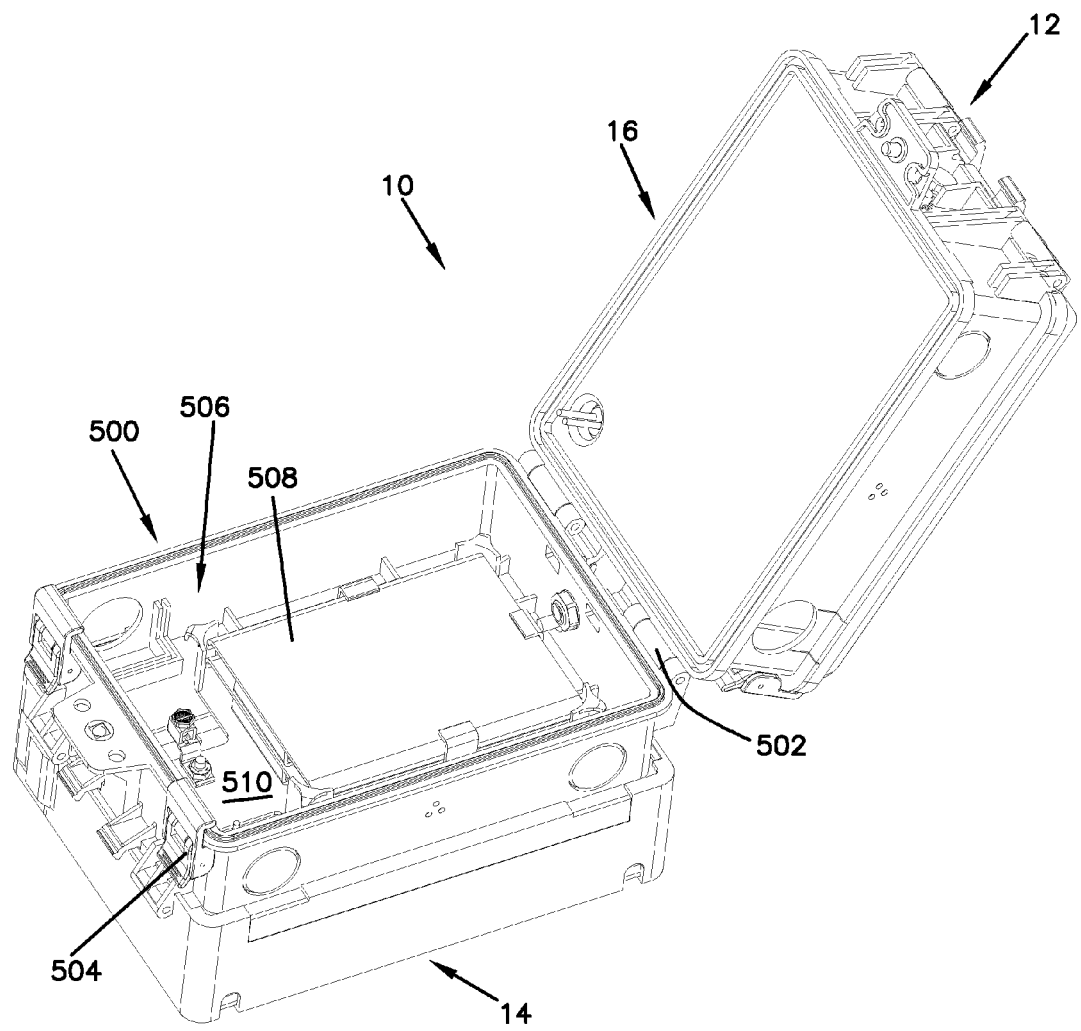

Referring now to FIGS. 37-39, a cable adapter 470 is shown. The cable adapter 470 is configured for snap-fit engagement with the shroud 400. The cable adapter 470 is generally cylindrical in shape and includes a first axial end portion 472 and an opposite second axial end portion 474. The cable adapter 470 defines a bore 476 that extends through the first and second axial end portions 472, 474.

The first axial end portion 472 includes a plurality of resilient latches 478 that extend outwardly from the first axial end portion 472 in an axial direction. The resilient latches 478 are adapted for engagement with notches 480 (shown in FIG. 32) disposed in the shroud 400, 420, 440 and/or the main body 16.

The second axial end portion 474 includes a plurality of resilient latches 482. Each of the resilient latches 482 includes a free end 484 that extends inwardly into the bore 476 of the cable adapter 470. In the subject embodiment, the resilient latches 482 are adapted to engage cable conduit.

Referring now to FIGS. 40-43, the fiber optic enclosure 10 is shown with a splice module 500. In the subject embodiment, the fiber optic enclosure 10 is modular. As a modular enclosure, the main body 16 can be removed from the enclosure mount 114 and engaged with the splice module 500. In the subject embodiment, the main body 16 is pivotally engaged with the splice module 500 by a hinge 502. The hinge 502 allows the main body 16 to selectively pivot relative to the splice module 500 between a closed position (shown in FIG. 40) and an open position (shown in FIGS. 41-43). A plurality of latches 504 is adapted to secure the main body 16 in the closed position relative to the splice module.

The splice module 500 defines an interior 506. A splice tray 508 is disposed in the interior 506 of the splice module 500. The splice tray 508 is engaged with a splice tray holder 510. In the subject embodiment, the splice tray 508 is in snap-fit engagement with the splice tray holder 510.

In one embodiment, the splice tray holder 510 is in snap-fit engagement with the splice module 500.

Figure 44:
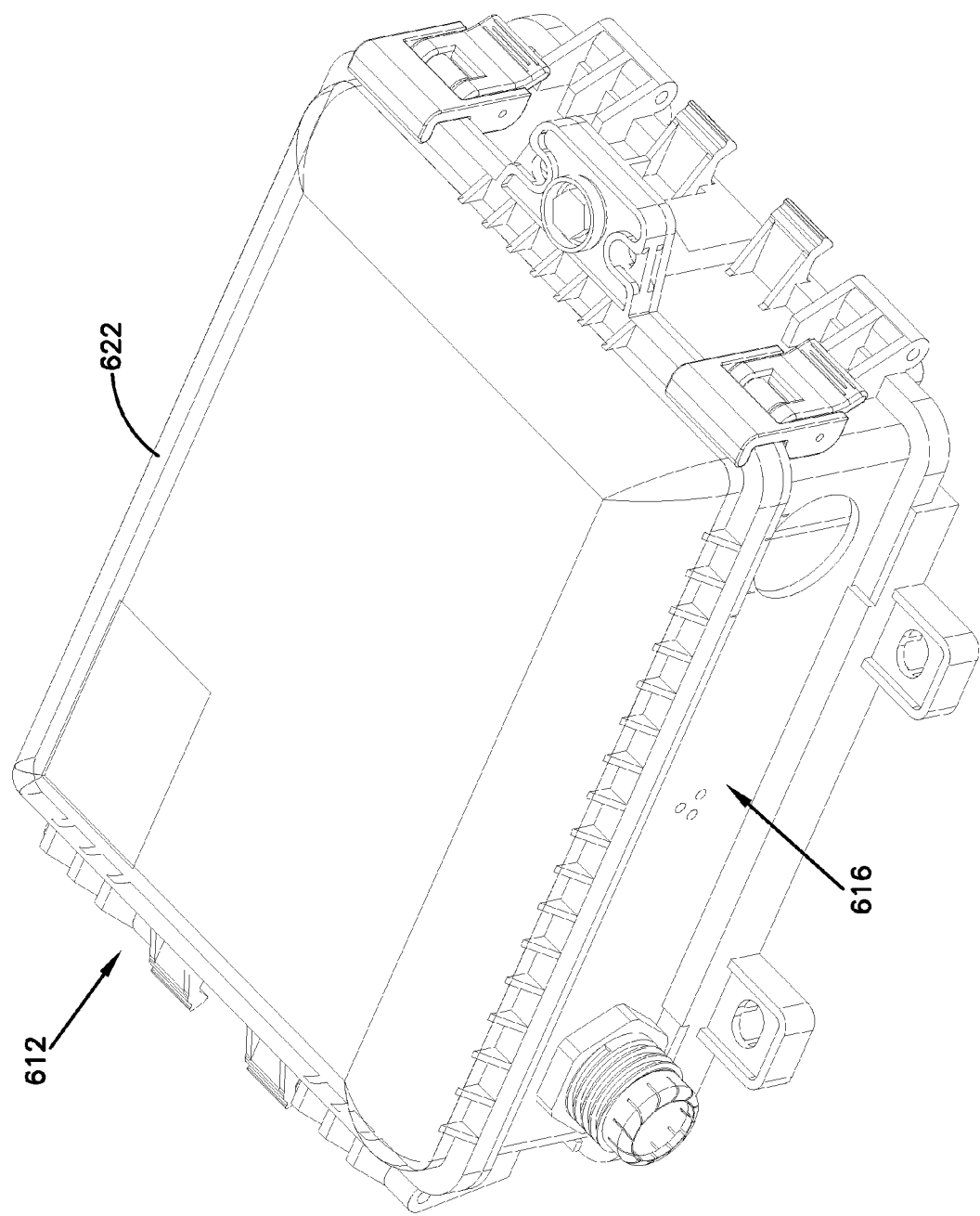
FIGS. 44-46 are perspective views of an alternate embodiment of a main body suitable for use with the fiber optic enclosure of FIG. 1.
Figure 45:
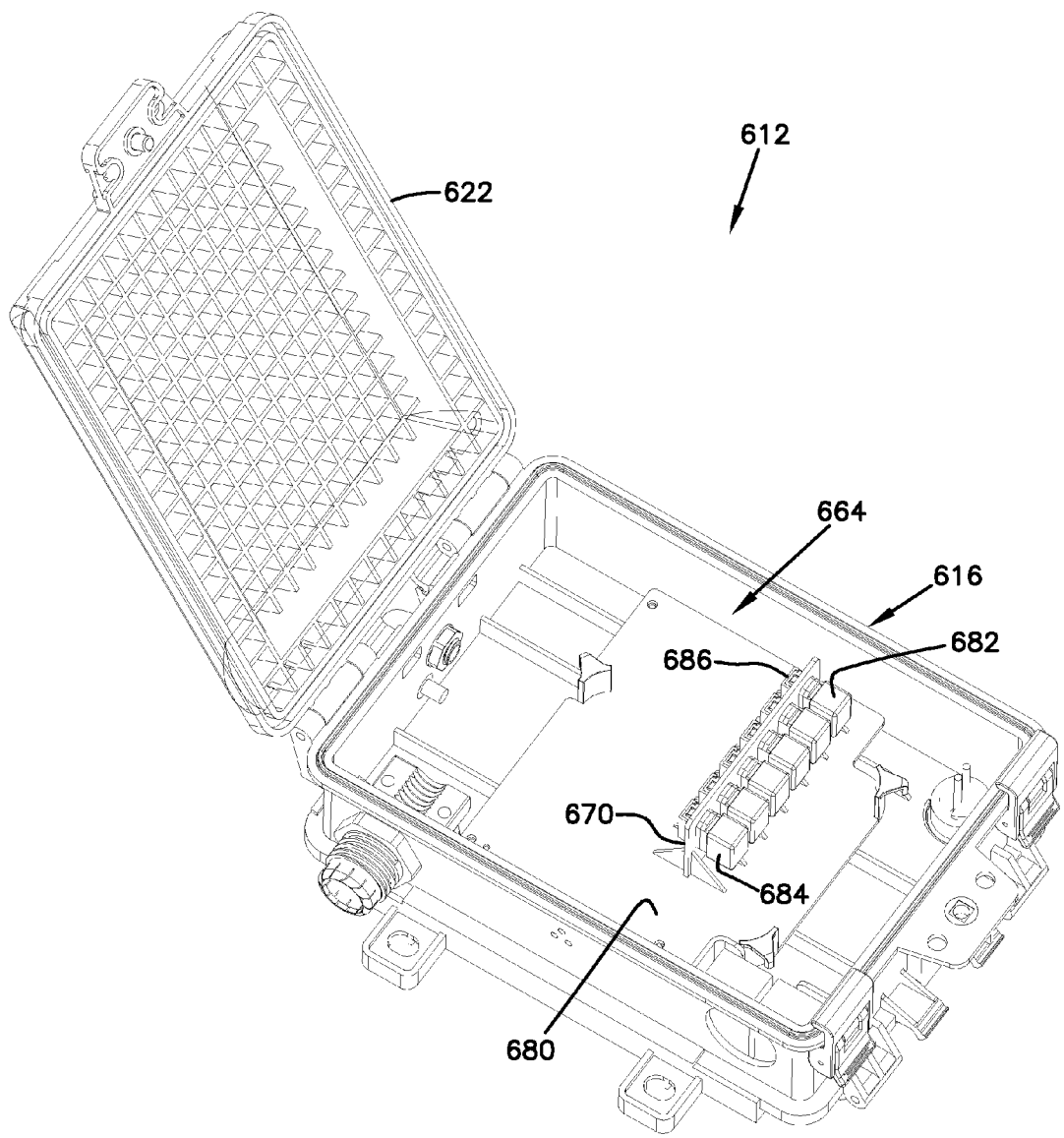
Figure 46:
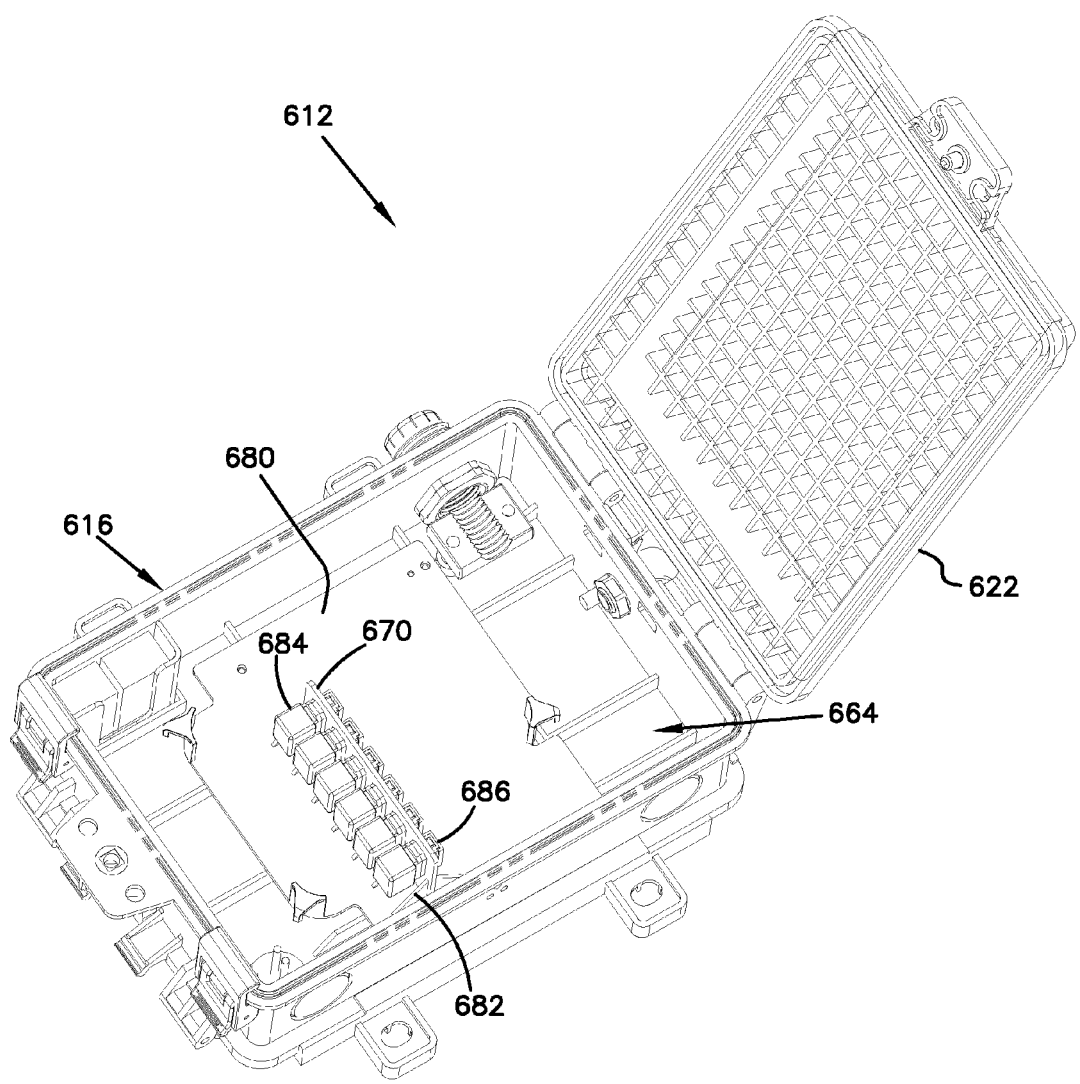

Referring now to FIGS. 44-46, an alternate embodiment of a housing 612 is shown. The housing 612 includes a main body 616 and a cover 622 pivotally engaged with the main body 616. The main body 616 and the cover 622 cooperatively define an interior region 664.

A bulkhead 670 is disposed in the interior region 664. The bulkhead 670 is mounted to a termination tray 680. The termination tray 680 is in engagement with the main body 616. The bulkhead 670 includes a plurality of adapters 682 mounted to the bulkhead 670. The adapters 682 include a first end 684 and an opposite second end 686. Each of the first and second ends 684, 686 is adapted to receive a connectorized end of a fiber optic cable.

Various modifications and alterations of this disclosure will become apparent to those skilled in the art without departing from the scope and spirit of this disclosure, and it should be understood that the scope of this disclosure is not to be unduly limited to the illustrative embodiments set forth herein.

What is claimed is:

1. A fiber optic enclosure comprising:
a housing having:
a main body; and
a cover mounted to the main body, the cover and the main body cooperatively defining an interior region; and
a cable spool assembly connected to an exterior of the housing, the cable spool assembly having a drum portion and a strain relief post, wherein the strain relief post is disposed between the drum portion and the interior region.

2. The fiber optic enclosure of claim 1, wherein the main body includes a termination tray mounted to a base wall of the main body.

3. The fiber optic enclosure of claim 2, wherein a plurality of adapters is mounted to the termination tray.

4. The fiber optic enclosure of claim 1, wherein the main body includes a base wall and a plurality of sidewalls, the base wall defining a cable entry opening.

5. The fiber optic enclosure of claim 4, further comprising a grommet disposed in the cable entry opening.

6. The fiber optic enclosure of claim 1, further comprising a mounting plate, the mounting plate having a spindle, the spindle being adapted for engagement with the cable spool assembly so that the cable spool assembly can rotate about a rotating axis of the spindle.

7. The fiber optic enclosure of claim 1, further comprising an enclosure mount, the enclosure mount including a first face and an oppositely disposed second face, the first face being adapted for engagement with the drum portion of the cable spool assembly, the second face being adapted for engagement with the main body of the housing.

8. The fiber optic enclosure of claim 7, wherein the strain relief post is disposed on a strain relief insert.

9. The fiber optic enclosure of claim 8, wherein the strain relief insert is disposed in a central recess of the second face.

10. A fiber optic enclosure comprising
a housing having:
a main body; and
a cover mounted to the main body, the cover and the main body cooperatively defining an interior region; and
a cable spool mounting assembly connected to an exterior of the housing, the cable spool mounting assembly including:
a cable spool assembly having:
an enclosure mount including a first face and an oppositely disposed second face, the first face including a drum portion that extends outwardly from the first face, the second face including a strain relief post, wherein the second face is adapted to receive the housing;
a flange engaged with the drum portion;
a mounting plate having a spindle, the spindle being engaged to the drum portion of the cable spool assembly, wherein the cable spool assembly is adapted to selectively rotate about the spindle.

11. The fiber optic enclosure of claim 10, wherein the second face of the enclosure mount includes a central recess.

12. The fiber optic enclosure of claim 11, wherein the strain relief post is disposed in the central recess.

13. The fiber optic enclosure of claim 10, wherein the second face of the enclosure mount defines a cable guide that provides a cable pathway to the housing.

14. The fiber optic enclosure of claim 13, wherein the cable guide includes a plurality of retention tabs that extend outwardly from sidewalls of the cable guide.

15. A fiber optic enclosure comprising
a housing having:
a main body having a base wall and a plurality of sidewalls, the base wall defining a cable entry opening;
a cover mounted to the main body, the cover and the main body cooperatively defining an interior region; and
a plurality of adapters disposed in the interior region;
a cable spool mounting assembly connected to an exterior of the housing, the cable spool mounting assembly including:
a cable spool assembly having:
an enclosure mount including a first face and an oppositely disposed second face, the first face including a drum portion that extends outwardly from the first face, the second face being adapted to receive the housing, the second face including a strain relief post; and
a flange engaged with the drum portion;
a mounting plate having a spindle, the spindle being engaged to the drum portion of the cable spool assembly, wherein the cable spool assembly is adapted to selectively rotate about the spindle; and
a fiber optic cable wrapped about the drum portion of the cable spool assembly, the fiber optic cable having an end portion that is wrapped around the strain relief post before entering the interior region.

16. The fiber optic enclosure of claim 15, wherein the cable spool assembly includes a strain relief insert that is engaged to the drum portion, the strain relief insert including the strain relief post.

17. The fiber optic enclosure of claim 16, wherein the strain relief insert is disposed in a central recess defined by the second face of the enclosure mount.

18. The fiber optic enclosure of claim 15, wherein the housing includes a grommet disposed in the cable entry opening of the base wall of the main body.

19. The fiber optic enclosure of claim 18, wherein the grommet includes an end surface that is arcuate in shape.

20. A fiber optic enclosure comprising:
   a housing having:
      a main body; and
      a cover mounted to the main body, the cover and the main body cooperatively defining an interior region;
   a plurality of fiber optic adapters disposed in the interior region; and
   a cable spool assembly connected to an exterior of the housing, the cable spool assembly having:
      a drum portion having an outer surface around which a fiber optic cable is wrapped, the outer surface of the drum portion defining a passage through which an end portion of the fiber optic cable can pass for access to the main body of the housing, the passage having a first sidewall and an oppositely disposed second sidewall, each of the first and second sidewalls having a radius portion that is adapted to prevent damage to the fiber optic cable resulting from bending.

21. The fiber optic enclosure of claim 20, wherein the cable spool assembly includes a strain relief post about which the end portion of the fiber optic cable is wrapped, the strain relief post preventing tension from being applied to the fiber optic cable between the strain relief post and the plurality of adapters.

* * * * *